(12) United States Patent
Tezuka et al.

(10) Patent No.: US 9,947,936 B2
(45) Date of Patent: Apr. 17, 2018

(54) OXYGEN REDUCTION CATALYST AND METHOD FOR PRODUCING SAME

(75) Inventors: Noriyasu Tezuka, Tokyo (JP); Masaki Horikita, Tokyo (JP); Masayuki Yoshimura, Tokyo (JP); Yuji Ito, Tokyo (JP); Takashi Sato, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 546 days.

(21) Appl. No.: 14/371,568

(22) PCT Filed: Jul. 19, 2012

(86) PCT No.: PCT/JP2012/068343
§ 371 (c)(1),
(2), (4) Date: Jul. 10, 2014

(87) PCT Pub. No.: WO2013/105292
PCT Pub. Date: Jul. 18, 2013

(65) Prior Publication Data
US 2014/0349212 A1    Nov. 27, 2014

(30) Foreign Application Priority Data
Jan. 13, 2012   (JP) ................................. 2012-005243

(51) Int. Cl.
*H01M 4/90*   (2006.01)
*H01M 4/92*   (2006.01)
(Continued)

(52) U.S. Cl.
CPC ....... *H01M 4/9041* (2013.01); *H01M 4/8652* (2013.01); *H01M 4/90* (2013.01);
(Continued)

(58) Field of Classification Search
CPC ....... H01M 4/90; H01M 4/9016; H01M 4/926
See application file for complete search history.

(56) References Cited

U.S. PATENT DOCUMENTS

| 2009/0029216 A1 | 1/2009 | Yamamoto |
| 2011/0020729 A1 | 1/2011 | Monden et al. |

(Continued)

FOREIGN PATENT DOCUMENTS

| EP | 2258475 A1 | 12/2010 |
| JP | 2011115760 A | 6/2011 |

(Continued)

OTHER PUBLICATIONS

International Search Report dated Jul. 19, 2012 in counterpart International Application No. PCT/JP2012/068343.
Communication dated Oct. 2, 2015 from the European Patent Office in counterpart European Application No. 12865421.7.

*Primary Examiner* — Stephen Essex
(74) *Attorney, Agent, or Firm* — Sughrue Mion, PLLC

(57) ABSTRACT

The present invention concerns an oxygen reduction catalyst comprising composite particles in which primary particles of a titanium compound is dispersed into a carbon structure, wherein the composite particles have titanium, carbon, nitrogen and oxygen as constituent elements, and with regard to a ratio of number of atoms of each of the elements when titanium is taken as 1, a ratio of carbon is larger than 2 and 5 or less, a ratio of nitrogen is larger than 0 and 1 or less, and a ratio of oxygen is 1 or more and 3 or less, and an intensity ratio (D/G ratio) of D band peak intensity to G band peak intensity in a Raman spectrum is in the range of 0.4 to 1.0. The oxygen reduction catalyst according to the present invention has satisfactory initial performance and excellent start-stop durability.

18 Claims, 2 Drawing Sheets

(51) Int. Cl.
    *H01M 8/10*      (2016.01)
    *H01M 4/86*      (2006.01)
    *H01M 8/1004*    (2016.01)
    *H01M 8/04223*      (2016.01)
    *H01M 8/1018*       (2016.01)

(52) U.S. Cl.
    CPC ....... *H01M 4/9016* (2013.01); *H01M 4/9083* (2013.01); *H01M 4/921* (2013.01); *H01M 4/925* (2013.01); *H01M 8/1004* (2013.01); *H01M 8/04223* (2013.01); *H01M 2008/1095* (2013.01)

(56)        References Cited

U.S. PATENT DOCUMENTS

| | | |
|---|---|---|
| 2012/0094207 A1 | 4/2012 | Wakizaka et al. |
| 2012/0231338 A1 | 9/2012 | Matsuzaka et al. |
| 2012/0315568 A1 | 12/2012 | Lee et al. |

FOREIGN PATENT DOCUMENTS

| | | | | |
|---|---|---|---|---|
| JP | 2011-194328 A | 10/2011 | | |
| WO | 2006088194 A1 | 8/2006 | | |
| WO | 2009104500 A1 | 8/2009 | | |
| WO | 2010126020 A1 | 11/2010 | | |
| WO | WO 2011070975 A1 * | 6/2011 | .......... | H01M 4/9083 |
| WO | 2011099493 A1 | 8/2011 | | |

\* cited by examiner

US 9,947,936 B2

OXYGEN REDUCTION CATALYST AND METHOD FOR PRODUCING SAME

CROSS REFERENCE TO RELATED APPLICATIONS

This application is a National Stage of International Application No. PCT/JP2012/068343 filed Jul. 19, 2012, claiming priority based on Japanese Patent Application No. 2012-005243, filed Jan. 13, 2012, the contents of all of which are incorporated herein by reference in their entirety.

TECHNICAL FIELD

The present invention relates to an oxygen reduction catalyst and a method for producing the same, and more specifically, to an oxygen reduction catalyst yielding a fuel cell having excellent initial performance and start-stop durability, and a method for producing the same.

BACKGROUND ART

A polymer electrolyte fuel cell (PEFC) is a fuel cell having a type of interposing a solid polymer electrolyte between an anode and a cathode, and supplying fuel to the anode and oxygen or air to the cathode on which oxygen is reduced, thereby producing electricity. Hydrogen, methanol or the like is mainly used for the fuel. In order to increase a reaction rate in the fuel cell and to enhance energy conversion efficiency thereof, a layer including a catalyst has been so far arranged on a cathode surface and/or an anode surface of the fuel cell. As the catalyst, a noble metal has been generally used, and among the noble metals, platinum having high activity and high stability toward high potential is mainly used. As a support for supporting such a catalyst metal, carbon black has been so far used.

Incidentally, the cathode is temporarily exposed to high potential, for example, about 1.5 V during operation of repeating start and stop of the PEFC. Under such high potential, the carbon support is known to be oxidized and corroded to cause decomposition and degradation in the presence of water. Power generation performance of PEFC decreases by degradation of the support. Further, agglomeration of the noble metal is promoted by degradation of the support and the power generation performance further decreases. Therefore, desire has been expressed for a support or a catalyst having resistance to high potential associated with start and stop, and an electrode catalyst for a fuel cell using the same.

Patent Literature 1 describes a support for supporting a catalyst as obtained by carbonizing a raw material containing a nitrogen-containing organic matter and a metal. Patent Literature 2 describes an electrode catalyst for a fuel cell as produced by a production method, comprising Step 1 for mixing a transition metal-containing compound, a nitrogen-containing organic compound and a solvent to give a catalyst precursor solution, Step 2 for removing the solvent from the catalyst precursor solution, and Step 3 for heat-treating a solid residue at a temperature of 500 to 1,100° C. to give the electrode catalyst, wherein the transition metal-containing compound partially or wholly contains a transition metal element M1 selected from Group 4 elements and Group 5 elements of Periodic Table as a transition metal element. Patent Literature 3 describes a catalyst produced by a production method, comprising a step for allowing a gas of a compound containing a metal element M selected from the group consisting of titanium, iron, niobium, zirconium and tantalum, a hydrocarbon gas, a nitrogen compound gas and an oxygen compound gas to react therewith at 600 to 1,600° C. Patent Literature 4 describes a support for a catalyst, comprising metal oxycarbonitride containing niobium or the like as a metal.

However, any one of the supports or the catalysts described above has had no sufficient resistance to high potential associated with start and stop.

CITATION LIST

Patent Literatures

[Patent Literature 1] JP-A-2011-115760
[Patent Literature 2] WO-A-2011/099493
[Patent Literature 3] WO-A-2010/126020
[Patent Literature 4] WO-A-2009/104500

SUMMARY OF THE INVENTION

Technical Problem

A subject of the present invention is to solve problems in such a conventional art, and an object of the present invention is to provide an oxygen reduction catalyst having satisfactory initial performance and excellent start-stop durability, and also to provide a method for producing the same.

Solution to Problem

The present inventors have diligently continued to conduct study to solve the problem of the conventional art, and as a result, have found that a catalyst has satisfactory initial performance and excellent start-strop durability, wherein the catalyst contains composite particles having structure in which primary particles of a titanium compound are dispersed into a carbon structure, the composite particles have titanium, carbon, nitrogen and oxygen as constituent elements, a ratio of number of atoms of carbon to titanium is at a predetermined level or more, and a relative ratio of amorphous-like carbon to graphite-like carbon quantified from a Raman spectrum is at a predetermined level or less, and thus have completed the present invention.

The present invention concerns [1] to [18] described below, for example.

[1] An oxygen reduction catalyst containing composite particles in which primary particles of a titanium compound are dispersed into a carbon structure, wherein the composite particles have titanium, carbon, nitrogen and oxygen as constituent elements, and with regard to a ratio of number of atoms of each of the elements when titanium is taken as 1, a ratio of carbon is larger than 2 and 5 or less, a ratio of nitrogen is larger than 0 and 1 or less, and a ratio of oxygen is 1 or more and 3 or less, and an intensity ratio (D/G ratio) of D band peak intensity to G band peak intensity in a Raman spectrum is in the range of 0.4 to 1.0.

[2] The oxygen reduction catalyst according to [1], wherein the composite particles further contain at least one kind of element M2 selected from iron, nickel, chromium, cobalt and manganese, and a ratio of number of atoms of total amount of element M2 to titanium is in the range of 0.3 or less.

[3] The oxygen reduction catalyst according to [1] or [2], wherein the composite particles have a peak, in X-ray diffraction (XRD) measurement using a Cu-Kα line, in each of regions A to D of a 2θ range described below:

A: 26 to 28°;
B: 35 to 37°;
C: 40 to 42°; and
D: 53 to 55°, and have a peak with the highest intensity of all the peaks that appear in a diffraction pattern in the region A.

[4] The oxygen reduction catalyst according to any one of [1] to [3], wherein a valence of titanium determined from a transmission X-ray absorption fine structure analysis (transmission XAFS) of the composite particles is larger than 3 and less than 4.

[5] The oxygen reduction catalyst according to any one of [1] to [4], further having particles comprising a noble metal or a noble metal alloy supported on the composite particles.

[6] The oxygen reduction catalyst according to [5], wherein the noble metal includes at least one kind of noble metal selected from platinum, palladium, iridium, rhodium and ruthenium.

[7] The oxygen reduction catalyst according to [5] or [6], wherein the noble metal alloy includes an alloy comprising noble metals, or a noble metal and at least one kind of metal selected from iron, nickel, chromium, cobalt, titanium, copper, vanadium and manganese.

[8] An ink for preparing a catalyst layer for a fuel cell, comprising the oxygen reduction catalyst according to any one of [1] to [7].

[9] A catalyst layer for a fuel cell, prepared using the ink for preparing the catalyst layer for the fuel cell according to [8].

[10] An electrode for a fuel cell, comprising the catalyst layer for the fuel cell according to [9].

[11] A membrane-electrode assembly, comprising a cathode catalyst layer and an anode catalyst layer, and a polymer electrolyte membrane arranged between both the catalyst layers, wherein the cathode catalyst layer and/or the anode catalyst layer is the catalyst layer for the fuel cell according to [9].

[12] A fuel cell, comprising the membrane-electrode assembly according to [11].

[13] A method for producing the oxygen reduction catalyst according to any one of [1] to [7], comprising:

Step 1 for mixing a titanium-containing compound (1), a nitrogen-containing organic compound (2) and a solvent to give a catalyst precursor solution;

Step 2 for removing the solvent from the catalyst precursor solution to give a solid residue;

Step 3 for heat-treating the solid residue obtained in Step 2 at a temperature of 700° C. to 1,400° C. to give a heat-treated material; and Step 4 for applying oxidation treatment of the heat-treated material obtained in Step 3 with an oxidizing agent giving an oxygen atom, wherein at least one of the titanium-containing compound (1) and the nitrogen-containing organic compound (2) has an oxygen atom, and oxidization in Step 4 is adjusted to render a D/G ratio in the range of 0.4 to 1.0.

[14] The method for producing the oxygen reduction catalyst according to [13], wherein the oxidizing agent giving the oxygen atom is at least one kind selected from water, hydrogen peroxide, perchloric acid and peracetic acid.

[15] The method for producing the oxygen reduction catalyst according to [13], wherein Step 4 overlaps with Step 3 and is applied after or at the same time as start of Step 3.

[16] The method for producing the oxygen reduction catalyst according to [15], wherein the oxidizing agent used in a part of Step 4, which overlaps with Step 3, is water.

[17] The method for producing the oxygen reduction catalyst according to [15] or [16], wherein Step 4 is applied even after end of Step 3.

[18] The method for producing the oxygen reduction catalyst according to [17], wherein the oxidizing agent used in a part of Step 4, which is applied after end of Step 3, is at least one kind selected from hydrogen peroxide, perchloric acid, and peracetic acid.

Advantageous Effects of the Invention

An oxygen reduction catalyst according to the present invention has satisfactory initial performance and excellent start-stop durability. A method for producing the oxygen reduction catalyst according to the present invention allows efficient production of the aforementioned oxygen reduction catalyst.

DESCRIPTION OF EMBODIMENTS

<Oxygen Reduction Catalyst>

Figure 1:
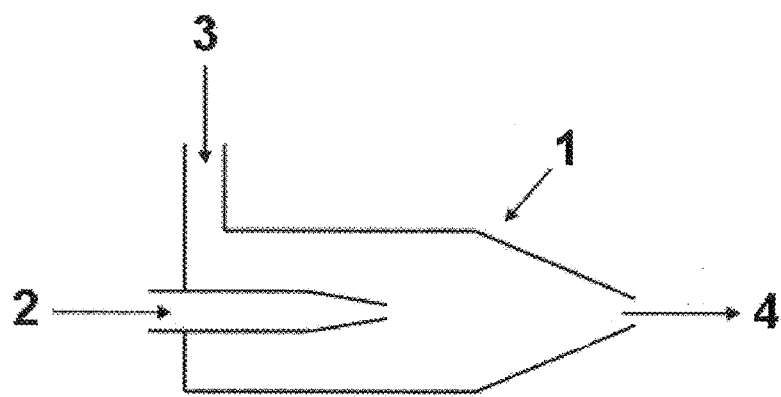
FIG. 1 is a schematic diagram of a reactor (1) used in Comparative Example 12.

An oxygen reduction catalyst related to the present invention includes an oxygen reduction catalyst containing composite particles in which primary particles of a titanium compound are dispersed into a carbon structure, wherein the composite particles have titanium, carbon, nitrogen and oxygen as constituent elements, and with regard to a ratio of number of atoms of each of the elements when titanium is taken as 1, a ratio of carbon is larger than 2 and 5 or less, a ratio of nitrogen is larger than 0 and 1 or less, and a ratio of oxygen is 1 or more and 3 or less, and an intensity ratio (D/G ratio) of D band peak intensity to G band peak intensity in a Raman spectrum is in the range of 0.4 to 1.0.

The composite particles have titanium, carbon, nitrogen and oxygen as the constituent elements, and may also contain a second metal element M2. With regard to the ratio of number of atoms of carbon, nitrogen and oxygen when titanium is taken as 1, the ratio of carbon is larger than 2 and 5 or less, preferably, in the range of 2.5 to 5, and further preferably, in the range of 3 to 5, the ratio of nitrogen is larger than 0 and 1 or less, preferably, in the range of 0.01 to 0.4, and further preferably, in the range of 0.02 to 0.2, and the ratio of oxygen is in the range of 1 to 3, preferably, in the range of 1 to 2.5, and further preferably, in the range of 1.2 to 2.2. When the ratio of each element is in the above-described range, initial performance of the oxygen reduction catalyst becomes satisfactory, and the start-stop durability also becomes satisfactory.

When the composite particles contain the second metal element M2, performance of the oxygen reduction catalyst is improved. Specific examples of the second metal element M2 include at least one kind selected from iron, nickel, chromium, cobalt and manganese. Among the elements, from a viewpoint of a balance between cost and catalyst performance, iron and chromium are preferred, and iron is particularly preferred. A ratio of number of atoms of M2 to titanium is preferably in the range of 0.3 or less, and further preferably, in the range of 0.05 to 0.2. When the ratio of number of atoms of M2 to titanium is in the above-described range, the performance of the oxygen reduction catalyst further improves.

In the composite particles, the intensity ratio (D/G ratio) of D band peak intensity to G band peak intensity in the Raman spectrum is in the range of 0.4 to 1.0, preferably, in the range of 0.5 to 0.95, and further preferably, in the range of 0.6 to 0.9. When the D/G ratio is 1.0 or less, the initial performance of the oxygen reduction catalyst becomes satisfactory, and also the start-stop durability becomes satisfactory. Although satisfactory initial performance and satisfactory start-stop durability are obtained when the D/G ratio is smaller than 0.4, such a smaller D/G ratio is not effective from a viewpoint of cost effectiveness.

In X-ray diffraction (XRD) measurement using a Cu-Kα line, the composite particles preferably have a peak in each of regions A to D of the 2θ range described below:

A: 26 to 28°;
B: 35 to 37°;
C: 40 to 42°; and
D: 53 to 55°, and have a peak with the highest intensity of all the peaks that appear in a diffraction pattern in the region A. A catalyst meeting such conditions is thought to have rutile type titanium oxide as a main phase. If the oxygen reduction catalyst according to the present invention meets such conditions, the initial performance and the start-stop durability become further satisfactory.

In the composite particles, valence of titanium determined from a transmission X-ray absorption fine structure analysis (transmission XAFS) of titanium is preferably larger than 3 and less than 4. When the valence of titanium is within the above-described range, electrical conductivity of the composite particles is improved, and the initial performance of the oxygen reduction catalyst becomes further satisfactory.

A specific surface area of the composite particles calculated by a BET method is preferably 100 $m^2/g$ or more, further preferably, in the range of 100 to 600 $m^2/g$, and still further preferably, in the range of 150 to 600 $m^2/g$.

The oxygen reduction catalyst according to the present invention preferably contains the composite particles, and further has particles comprising a noble metal or a noble metal alloy supported on the composite particles. If the oxygen reduction catalyst according to the present invention is a composite catalyst having such particles, excellent durability is shown in a start-stop durability test of a fuel cell, and the initial performance is also satisfactory.

Specific examples of the noble metals include at least one kind selected from platinum, gold, palladium, iridium, rhodium and ruthenium. Among the metals, at least one kind selected from platinum, palladium and iridium is preferred, and platinum is further preferred. Specific examples of the noble metal alloys include an alloy of the noble metals, and an alloy of the noble metal with at least one kind of metal selected from iron, nickel, chromium, cobalt, titanium, copper, vanadium and manganese. Among the alloys, an alloy of platinum with at least one kind selected from iron, cobalt and nickel is particularly preferred.

An amount of the supported noble metal is preferably, with respect to the total amount of the oxygen reduction catalyst, in the range of 5 to 50% by mass, and further preferably, in the range of 20 to 40% by mass. If the oxygen reduction catalyst according to the present invention contains the noble metal at such a ratio, excellent initial performance as well as satisfactory durability is shown in the start-stop durability test of the fuel cell.

The oxygen reduction catalyst according to the present invention can be produced, for example, by the production method described below.

<Method for Producing Oxygen Reduction Catalyst>

A method for producing the oxygen reduction catalyst according to the invention is a method for producing the above-described oxygen reduction catalyst, comprising:

Step 1 for mixing a titanium-containing compound (1), a nitrogen-containing organic compound (2) and a solvent to give a catalyst precursor solution;

Step 2 for removing the solvent from the catalyst precursor solution to give a solid residue;

Step 3 for applying heat treatment to the solid residue, and Step 4 for applying oxidation treatment, wherein at least one of the titanium-containing compound (1) and the nitrogen-containing organic compound (2) has an oxygen atom.

The method for producing the oxygen reduction catalyst has features of applying oxidation treatment to titanium oxycarbonitride obtained by calcining the precursor comprising the titanium-containing organic complex and the organic compound, or applying the oxidization treatment while calcining the precursor to reduce an amount of amorphous carbon and to decrease the D/G ratio.

Specific examples of the method for producing the oxygen reduction catalyst according to the present invention include three embodiments as described below.

First Embodiment

A production method of the present invention includes a method for producing the oxygen reduction catalyst, comprising:

Step 1 for mixing a titanium-containing compound (1), a nitrogen-containing organic compound (2) and a solvent to give a catalyst precursor solution;

Step 2 for removing the solvent from the catalyst precursor solution to give a solid residue;

Step 3a for heat-treating the solid residue obtained in Step 2 at a temperature of 700° C. to 1,400° C. to give a heat-treated material; and Step 4a for applying oxidation treatment of the heat-treated material obtained in Step 3a with an oxidizing agent giving an oxygen atom, wherein at least one of the titanium-containing compound (1) and the nitrogen-containing organic compound (2) has an oxygen atom, and oxidization in Step 4 is adjusted to render a D/G ratio in the range of 0.4 to 1.0.

In the Embodiment, an embodiment of starting Step 4a after end of Step 3a is described below as First Embodiment.

(Step 1)

In Step 1, at least a titanium-containing compound (1), a nitrogen-containing organic compound (2) and a solvent are mixed to give a catalyst precursor solution. When composite particles containing a second metal element M2 are prepared, as a compound containing the second metal element M2, a compound (hereinafter, also referred to as "M2-containing compound (3)") containing at least one kind of metal element M2 selected from iron, nickel, chromium, cobalt and manganese may be further added to the catalyst precursor solution. An order of adding these materials is not particularly limited.

In order to perform reaction smoothly, mixing is preferably performed while stirring the solvent. On the occasion, when the above-described compound is hard to dissolve in the solvent, warming is allowed. When heat is rapidly generated during mixing, mixing is made while cooling the materials, or little by little.

Titanium-Containing Compound (1)

A titanium-containing compound (1) preferably has at least one kind selected from an oxygen atom and a halogen atom. Specific examples thereof include a titanium complex and titanium phosphate, sulfate, nitrate, organic acid salt, acid halide (intermediate hydrolyzate of halide), alkoxide, ester, halide, perhalogenated acid salt and hypohalous acid salt. Further preferred examples include at least one kind selected from titanium alkoxide, ester, acetylacetone complex, chloride, bromide, iodide, acid chloride, acid bromide, acid iodide and sulfate, and still further preferred examples include alkoxide or an acetylacetone complex from a viewpoint of solubility to a solvent in the liquid phase. These compounds may be used alone or in combination of two or more kinds.

Specific examples of the titanium-containing compound (1) include;

a titanium compound such as titanium tetramethoxide, titanium tetraethoxide, titanium tetrapropoxide, titanium tetraisopropoxide, titanium tetrabutoxide, titanium tetraisobutoxide, titanium tetrapentoxide, titanium tetraacetylacetonate, titanium oxydiacetylacetonate, tris(acetylacetonate) secondary titanium chloride ($[Ti(acac)_3]_2[TiCl_6]$), titanium tetrachloride, titanium trichloride, titanium oxychloride, titanium tetrabromide, titanium tribromide, titanium oxybromide, titanium tetraiodide, titanium triiodide and titanium oxyiodide. These compounds may be used alone or in combination of two or more kinds.

As mentioned above, if the composite particles contain the second metal element M2, performance of the oxygen reduction catalyst is improved.

Specific examples of the M2-containing compound (3) include;

an iron compound such as iron(II) chloride, iron(III) chloride, iron(III) sulfate, iron(II) sulfide, iron(III) sulfide, potassium ferrocyanide, potassium ferricyanide, ammonium ferrocyanide, ammonium ferricyanide, ferric ferrocyanide, iron(II) nitrate, iron(III) nitrate, iron(II) oxalate, iron(III) oxalate, iron(II) phosphate, iron(III) phosphate, ferrocene, iron(II) hydroxide, iron(III) hydroxide, iron(II) oxide, iron (III) oxide, triiron tetraoxide, iron(II) ethylenediaminetetraacetate ammonium, iron(II) acetate, iron(II) lactate and iron(III) citrate;

a nickel compound such as nickel(II) chloride, nickel(II) sulfate, nickel(II) sulfide, nickel(II) nitrate, nickel(II) oxalate, nickel(II) phosphate, nickelocene, nickel(II) hydroxide, nickel(II) oxide, nickel(II) acetate and nickel(II) lactate;

a chromium compound such as chromium(II) chloride, chromium(III) chloride, chromium(III) sulfate, chromium (III) sulfide, chromium(III) nitrate, chromium(III) oxalate, chromium(III) phosphate, chromium(III) hydroxide, chromium(II) oxide, chromium(III) oxide, chromium(IV) oxide, chromium(VI) oxide, chromium(II) acetate, chromium(III) acetate and chromium(III) lactate;

a cobalt compound such as cobalt(II) chloride, cobalt(III) chloride, cobalt(II) sulfate, cobalt(II) sulfide, cobalt(II) nitrate, cobalt(III) nitrate, cobalt(II) oxalate, cobalt(II) phosphate, cobaltocene, cobalt(II) hydroxide, cobalt(II) oxide, cobalt(III) oxide, tricobalt tetroxide, cobalt(II) acetate and cobalt(II) lactate; and a manganese compound such as manganese(II) chloride, manganese(II) sulfate, manganese(II) sulfide, manganese(II) nitrate, manganese(II) oxalate, manganese(II) hydroxide, manganese(II) oxide, manganese(III) oxide, manganese(II) acetate, manganese (II) lactate and manganese citrate. These compounds may be used alone or in combination of two or more kinds.

Nitrogen-Containing Organic Compound (2)

As a nitrogen-containing organic compound (2) used in the production method according to the present invention, a compound that can be a ligand allowing coordination with a titanium atom in the titanium-containing compound (1) is preferred, and a compound that can be a multidentate ligand (preferably a bidentate ligand or a tridentate) so as to allow formation of a chelate is further preferred.

The nitrogen-containing organic compound (2) may be used alone or in combination of two or more kinds.

The nitrogen-containing organic compound (2) preferably has a functional group such as an amino group, a nitrile group, an imide group, an imine group, a nitro group, an amide group, an azide group, anaziridine group, anazo group, anisocyanate group, an isothiocyanate group, an oxime group, a diazo group and a nitroso group, or a ring such as a pyrrole ring, a porphyrin ring, an imidazole ring, a pyridine ring, a pyrimidine ring and a pyrazine ring (the functional groups and the rings are also collectively referred to as "nitrogen-containing molecular group").

If the nitrogen-containing organic compound (2) has the nitrogen-containing molecular group in a molecule, the compound (2) is thought to allow further strong coordination with a titanium atom originating in the titanium-containing compound (1) through mixing in Step 1.

Among the nitrogen-containing molecular groups, an amino group, an imine group, an amide group, a pyrrole ring, a pyridine ring and a pyrazine ring are further preferred, an amino group, an imine group, a pyrrole ring and a pyrazine ring are still further preferred, and an amino group and a pyrazine ring are particularly preferred in view of particularly enhanced activity of the oxygen reduction catalyst obtained.

The nitrogen-containing organic compound (2) preferably has a hydroxyl group, a carboxyl group, a formyl group, a halocarbonyl group, a sulfonate group, a phosphate group, a ketone group, an ether group or an ester group (these are also collectively referred to as "oxygen-containing molecular group"). If the nitrogen-containing organic compound (2) has the oxygen-containing molecular group in a molecule, the compound (2) is thought to allow further strong coordination, through mixing in Step 1, with a titanium atom originating in the titanium-containing compound (1).

Among the oxygen-containing molecular groups, a carboxyl group and a formyl group are particularly preferred in view of particularly enhanced activity of the oxygen reduction catalyst obtained.

As a compound having the nitrogen-containing molecular group and the oxygen-containing molecular group, amino acid having an amino group and a carboxyl group, and a derivative thereof are preferred.

As the amino acid, alanine, arginine, asparagine, aspartic acid, cysteine, glutamine, glutamic acid, glycine, histidine, isoleucine, leucine, lysine, methionine, phenylalanine, serine, threonine, tryptophane, tyrosine, valine, norvaline, glycylglycine, triglycine and tetraglycine are preferred. In addition to the amino acid or the like, specific examples include acyl pyrroles such as acetyl pyrrole, pyrrole carboxylic acid, acyl imidazoles such as acetyl imidazole, carbonyldiimidazole, imidazolecarboxylic acid, pyrazole, acetanilide, pyrazinecarboxylic acid, piperidinecarboxylic acid, piperazinecarboxylic acid, morpholine, pyrimidinecarboxylic acid, nicotinic acid, 2-pyridinecarboxylic acid, 2,4-pyridinedicarboxylic acid, 8-quinolinol and polyvinylpyrrolidone. In view of high activity of the oxygen reduction catalyst obtained, a compound that can be a bidentate ligand, specifically, pyrrole-2-carboxylic acid, imidazole-4-carboxylic acid, 2-pyrazinecarboxylic acid, 2-piperidinecarboxylic acid, 2-piperazinecarboxylic acid, nicotinic acid, 2-pyridinecarboxylic acid, 2,4-pyridinedicarboxylic acid and 8-quinolinol are preferred. Among the compounds, alanine, glycine, lysine, methionine, tyrosine, 2-pyrazinecarboxylic acid and 2-pyridinecarboxylic acid are further preferred.

In order to facilitate adjustment of content of a carbon atom in the composite particles to the above-described preferred range, a ratio (B/A) of total number (B) of atoms of carbon in the nitrogen-containing organic compound (2) used in Step 1 to the number (A) of atoms of a titanium element in the titanium-containing compound (1) used in Step 1 is preferably in the range of 2 to 200, further preferably, in the range of 3 to 100, and still further preferably, in the range of 5 to 50.

In order to facilitate adjustment of content of a nitrogen atom in the composite particles to the above-described preferred range, a ratio (C/A) of total number (C) of atoms of nitrogen in the nitrogen-containing organic compound (2) used in Step 1 to the number (A) of atoms of a titanium element in the titanium-containing compound (1) used in Step 1 is preferably in the range of 1 to 28, further preferably, in the range of 2 to 17, and still further preferably, in the range of 3 to 12.

When a ratio of the titanium-containing compound (1) and the M2-containing compound (3) that are used in Step 1 is converted into a mole ratio (M1:M2) of a titanium (M1) atom to a metal element M2 atom to express a converted mole ratio in an expression: M1:M2=1:a, a is preferably in the range of 0.3 or less, and further preferably, in the range of 0.05 to 0.2.

Solvent

Specific examples of the solvent include water, acetic acid, acetylacetone, alcohols and a mixed solvent thereof. As the alcohols, ethanol, methanol, butanol, propanol and ethoxyethanol are preferred, and ethanol and methanol are further preferred. Incorporation of acid into the solvent is preferred to increase solubility, and as the acid, acetic acid, nitric acid, hydrochloric acid, phosphoric acid and citric acid are preferred, and acetic acid and nitric acid are further preferred. These solvents may be used alone or in combination of two or more kinds.

(Step 2)

In Step 2, the solvent is removed from the catalyst precursor solution obtained in Step 1 to give a solid residue. A method for removing the solvent is not particularly limited, and specific examples include a method using a spray dryer or a rotary evaporator.

Depending on a method for removing the solvent, or properties of the titanium-containing compound (1) or the nitrogen-containing organic compound (2), a composition of the solid residue obtained in Step 2 or an agglomeration state thereof may be occasionally non-uniform. In such a case, if the solid residue is formed into further uniform and finer powder by mixing and disintegrating and then provided for use in Step 3, a catalyst having a further uniform particle diameter can be obtained.

In order to mix and disintegrate the solid residue, specific examples include a method using a mortar, an automatic kneading mortar or a ball mill. When the solid residue is in a large amount, and is subject to continuous mixing or integration treatment, specific examples include a method using a jet mill.

(Step 3a)

In Step 3a, the solid residue obtained in Step 2 is heat-treated to give a heat-treated material.

A temperature upon this heat treatment is in the range of 700° C. to 1,400° C., and preferably, in the range of 800° C. to 1,300° C. In order to form rutile type titanium oxide as a main phase in the composite particles, a temperature of 700° C. or higher is required. If the temperature exceeds 1,400° C., adjustment of content of carbon, nitrogen and oxygen in the composite particles within the above-described range becomes difficult.

Specific examples of the heat treatment methods include a static method, a stirring method, a dropping method and a powder collecting method.

When the heat treatment is applied by the static method, a heating rate is not particularly limited, but is preferably about in the range of 1° C. per minute to 100° C. per minute, and further preferably, in the range of 5° C. per minute to 50° C. per minute. Heating time is preferably in the range of 0.1 to 10 hours, further preferably, in the range of 0.5 to 5 hours, and still further preferably, in the range of 0.5 to 3 hours. When heating is performed in an infrared furnace such as an infrared gold image furnace and a tubular furnace in the static method, heating time is in the range of 0.1 to 10 hours, and preferably, in the range of 0.5 to 5 hours. When the heating time is within the above-described range, uniformly heat-treated material particles tend to be formed.

In the case of the stirring method typified by a method using a rotary kiln or the like, heating time of the solid residue is ordinarily in the range of 0.1 to 5 hours, and preferably, in the range of 0.5 to 2 hours. In the present method, when heating is continuously performed by inclining the furnace, or the like, average residence time calculated from a steady sample flow rate in the furnace is taken as the heating time.

In the case of the dropping method, heating time of the solid residue is ordinarily in the range of 0.5 to 10 minutes, and preferably, in the range of 0.5 to 3 minutes. When the heating time is within the above-described range, uniformly heat-treated material particles tend to be formed.

In the case of the powder collecting method, heating time of the solid residue is in the range of 0.2 second to 1 minute, and preferably, in the range of 0.2 to 10 seconds. When the heating time is within the above-described range, uniformly heat-treated material particles tend to be formed.

In order to facilitate adjustment of content of each constituent element of the composite particles within the above-described range, an electric furnace or an infrared furnace such as an infrared gold image furnace using electricity as a heat source to allow strict temperature control is preferably used.

In order to facilitate adjustment of the content of each constituent element of the composite particles within the above-described range, an atmosphere upon applying the heat treatment preferably includes a non-oxidizing atmosphere. In that sense, a main component thereof preferably includes the non-oxidizing gas atmosphere. Among non-oxidizing gases, in view of relative inexpensiveness and availability, nitrogen, argon, helium and hydrogen are preferred, nitrogen and argon are further preferred, and a mixed gas of these gases and hydrogen is still further preferred. The non-oxidizing gases may be used alone or in combination of two or more kinds.

When a hydrogen gas is contained in the atmosphere of the heat treatment, a concentration of the hydrogen gas is, for example, 100 vol % or less, preferably, in the range of 1 to 20 vol %, and further preferably, in the range of 1 to 5 vol %.

The heat-treated material obtained by the heat treatment may be directly used in a next step, or may be further disintegrated and then used in the next step. In addition, an operation of making the heat-treated material finer, such as disintegration and crushing, is herein expressed as "disintegration" without particular distinction. Disintegration occasionally allows improvement in processability upon producing an electrode using the oxygen reduction catalyst obtained, and improvement in characteristics of the resultant electrode. For the disintegration, for example, a roll tumbling mill, a ball mill, a small-diameter ball mill (bead mill), a medium stirring mill, an airflow grinder, a mortar, an automatic kneading mortar, a vessel crusher or a jet mill can be used.

(Step 4a)

In Step 4a, the heat-treated material obtained in Step 3 is subjected to oxidation treatment using an oxidizing agent giving an oxygen atom so as to have the D/G ratio in the range of 0.4 to 1.0.

Specific examples of the oxidizing agent giving the oxygen atom include hydrogen peroxide, perchloric acid, peracetic acid and water. The water may be used in the form of steam.

The D/G ratio can be adjusted within the above-described range by adjusting a degree of oxidization. Oxidizing the product allows a decrease in the D/G ratio, but excessive oxidation treatment adversely causes an increase in the D/G ratio. Oxidization conditions for adjusting the D/G ratio within the above-described range may be determined by a preliminary experiment. The degree of oxidization can be adjusted by appropriately selecting a kind of oxidizing agent, an amount thereof, oxidation treatment temperature, oxidation treatment time or the like, and particularly, adjustment of the oxidation treatment temperature is important.

Second Embodiment

Second Embodiment includes an embodiment in which Steps 1 and 2 in First Embodiment are applied, and then Step 4 overlaps with Step 3 (hereinafter, a part of Step 4, which overlaps with Step 3, is also described as "Step 3b") and is applied after or at the same time as start of Step 3, and an oxidizing agent used in a part of Step 4, which overlaps with Step 3 (more specifically, Step 3b), is preferably water. Second Embodiment includes an embodiment in which Step 4 ends simultaneously with end of Step 3.

More specifically, Second Embodiment refers to a method for producing an oxygen reduction catalyst, comprising:

Step 1 for mixing a titanium-containing compound (1), a nitrogen-containing organic compound (2) and a solvent to give a catalyst precursor solution;

Step 2 for removing the solvent from the catalyst precursor solution to give a solid residue; and Step 3b for heat-treating the solid residue obtained in Step 2 at a temperature of 700° C. to 1,400° C. while introducing water thereinto to give a heat-treated material, wherein at least one of the titanium-containing compound (1) and the nitrogen-containing organic compound (2) has an oxygen atom.

Step 1 and Step 2 in Second Embodiment are similar to Step 1 and Step 2 in First Embodiment, respectively. A part before Step 4 is started, in Step 3, in Second Embodiment is similar to Step 3a in First Embodiment. Step 3b is described below.

(Step 3b)

In Step 3b, oxidation treatment is applied while heat-treating the solid residue obtained in Step 2. Step 4 is preferably applied overlappingly with Step 3 from the beginning of Step 3, and in Step 3b, the solid residue obtained in Step 2 is heat-treated at a temperature of 700° C. to 1,400° C. while introducing water thereinto to give a heat-treated material. By this treatment, the heat-treated material is subjected to oxidization treatment simultaneously with production of itself. As a result, an oxygen reduction catalyst having a D/G ratio in the range of 0.4 to 1.0 is obtained.

Preferred heat treatment conditions are similar to the conditions as exemplified in Step 3a in First Embodiment.

Heat treatment while introducing water thereinto is applied by mixing water in a gas atmosphere exemplified in Step 3a in First Embodiment. An amount of water to be introduced thereinto is not particularly restricted, as long as the oxidation treatment progresses, but incorporation of water into an atmospheric gas to be introduced at a saturated steam amount in the range of 0° C. to 50° C. is preferred in view of ease of handling.

Other conditions similar to the conditions in Step 3a in First Embodiment can also be applied.

Third Embodiment

Third Embodiment includes an embodiment in which Step 4 is applied even after end of Step 3b in Second Embodiment.

More specifically, in Third Embodiment, Step 4c similar to Step 4a is applied after end of Step 3b in Second Embodiment. However, Step 3b in this Embodiment is a step (hereinafter, also described as "Step 3c") in which oxidation treatment is not necessarily applied to adjust the D/G ratio in the range of 0.4 to 1.0.

In addition, an oxidizing agent used in Step 4 (Step 4a) in First Embodiment or apart of Step 4 (Step 4c), which is applied after end of Step 3, in Third Embodiment is preferably at least one kind selected from hydrogen peroxide, perchloric acid and peracetic acid in view of ease of handling.

Step 1 and Step 2 in Third Embodiment are similar to Step 1 and Step 2 in First Embodiment, respectively.

In Third Embodiment, oxidation treatment is applied to adjust the D/G ratio in the range of 0.4 to 1.0 in Step 3c, and oxidation treatment may be further applied in Step 4c in order to adjust the D/G ratio to a desired value.

Thus, application of Step 4 for oxidation treatment in two stages, Step 3c and Step 4c, has an advantage of ease of adjusting the D/G ratio.

In addition, a disintegration step may be arranged between Step 3c and Step 4c. The above disintegration step is similar to the disintegration step in First Embodiment.

[Supporting Noble Metal or Noble Metal Alloy]

A noble metal or a noble metal alloy (hereinafter, also described as "noble metal or the like") may be supported onto the composite particles (hereinafter, the resultant particles are also described as "composite catalyst").

A method for supporting the noble metal or the like is not particularly restricted, as long as supporting can be made so as to put the resultant material to practical use, and a method for supporting the noble metal or the like using a precursor of the noble metal or the like is preferred.

The precursor of the noble metal or the like herein means a substance that can be the noble metal or the like by predetermined treatment, and specific examples include chloroplatinic acid, iridium chloride and palladium chloride, and a mixture thereof.

A method for supporting the precursor of the noble metal or the like onto the composite particles is not to be particularly restricted, and a method applying a conventionally known catalyst metal supporting technique can be applied. Specific examples include (1) a method including a stage for allowing composite particles to disperse into a solution of a precursor of a noble metal or the like, a stage for evaporating the mixture containing the composite particles and the precursor of a noble metal or the like to obtain a solid residue, and a stage for subsequently applying heat treatment to the solid residue, (2) a method including a stage for allowing composite particles to disperse into a solution of colloid of a precursor of a noble metal or the like to adsorb colloid of the precursor of the noble metal or the like onto the composite particles, thereby supporting the noble metal or the like onto the composite particles, and (3) a method including a stage for adjusting pH of a mixture of a solution containing one kind of a precursor of a noble metal or the like or more kinds thereof, and a suspension containing the composite particles, thereby obtaining metal oxide, hydrous oxide or metal hydroxide and simultaneously adsorbing the resultant material onto the composite particles, a stage for reducing the resultant material, and when necessary, a stage for heat-treating the resultant material, but the method is not restricted thereto.

Use

The oxygen reduction catalyst according to the present invention does not always have a particularly limited use, but can be preferably used for an electrode catalyst for a fuel cell, an electrode catalyst for an air cell, or the like.

The oxygen reduction catalyst according to the present invention can be used as a catalyst alternative to a hitherto known platinum-supported carbon catalyst.

(Catalyst Layer for Fuel Cell)

A catalyst layer for a fuel cell can be produced from the above-described oxygen reduction catalyst.

The catalyst layer for the fuel cell includes an anode catalyst layer and a cathode catalyst layer. The oxygen reduction catalyst has excellent durability and high oxygen reduction ability, and therefore is preferably used in the cathode catalyst layer.

The catalyst layer for the fuel cell includes the oxygen reduction catalyst and a polymer electrolyte. In order to further reduce electric resistance in the catalyst layer, electron-conductive particles may be further incorporated into the catalyst layer.

Specific examples of material of the electron-conductive particles include carbon materials, an electrically conductive polymer, electrically conductive ceramics, a metal or electrically conductive inorganic oxide such as tungsten oxide or iridium oxide, and the material can be used alone or in combination thereof. In particular, electron-conductive particles comprising carbon materials have large specific surface area, good availability of inexpensive particles with small diameter, and excellent chemical resistance, and therefore the particles comprising carbon materials or a mixture of particles comprising carbon materials and other electron-conductive particles is especially preferable.

Specific examples of the carbon materials include carbon black, graphite, activated carbon, carbon nanotubes, carbon nanofibers, carbon nanohorns, fullerene, porous body carbon and graphene. When a particle diameter of the electron-conductive particles comprising carbon materials is excessively small, an electron-conducting path becomes hard to form, and when the diameter is excessively large, a decrease in gas diffusivity in the catalyst layer for the fuel cell or a decrease in catalyst utilization efficiency tends to be caused, and therefore the diameter is preferably in the range of 10 to 1,000 nm, and further preferably, in the range of 10 to 100 nm.

When the electron-conductive particles comprise carbon materials, a mass ratio (catalyst:electron-conductive particles) of the oxygen reduction catalyst to the electron-conductive particles is preferably in the range of 1:1 to 100:1.

The electrode catalyst layer for the fuel cell ordinarily includes a polymer electrolyte. The polymer electrolyte is not particularly limited, if the electrolyte is generally used in the catalyst layer for the fuel cell. Specific examples include a perfluorocarbon polymer having a sulfonate group (NAFION®), a hydrocarbon-based polymer compound having a sulfonate group, a polymer compound prepared by doping inorganic acid such as phosphoric acid, an organic/inorganic hybrid polymer partially replaced by a proton conductive functional group, and a proton conductor prepared by impregnating a phosphoric acid solution or a sulfuric acidic solution into a polymer matrix. Among the compounds, NAFION® is preferred. Specific examples of a supply source of NAFUIN® upon forming the catalyst layer for the fuel cell include a 5% NAFION® solution (DE521, manufactured by DuPont).

A method for forming the catalyst layer for the fuel cell is not particularly restricted, and specific examples include a method for applying a suspension prepared by dispersing a constitutional material of the catalyst layer for the fuel cell into a solvent onto an electrolyte membrane or a gas diffusion layer as described later. Specific examples of the application methods include a dipping method, a screen printing method, a roll coating method, a spray method and a bar coater application method. Specific examples also include a method for applying a suspension prepared by dispersing a constitutional material of the catalyst layer for the fuel cell to form the catalyst layer for the fuel cell on a substrate by an application method or a filtration method, and then forming the catalyst layer for the fuel cell on an electrolyte membrane by a transfer method. In addition, the suspension is taken as "ink for preparing the catalyst layer for the fuel cell."

(Electrode)

An electrode is formed of the catalyst layer for the fuel cell and the gas diffusion layer. An electrode including an anode catalyst layer is hereinafter referred to as "anode" and en electrode including a cathode catalyst layer as "cathode."

The gas diffusion layer means a porous and gas diffusion-facilitating layer. As the gas diffusion layer, any material may be used, as long as the material has electron conductivity, high gas diffusibility and high corrosion resistance, but a carbon-based porous material such as carbon paper and carbon cloth, or stainless steel or corrosion-resistant material-coated aluminum foil for weight reduction is generally used.

(Membrane-Electrode Assembly)

A membrane-electrode assembly is formed of a cathode catalyst layer, an anode catalyst layer and a polymer electrolyte membrane arranged between both of the catalyst layers described above. The membrane-electrode assembly may have a gas diffusion layer. On the occasion, a hitherto-known catalyst layer for the fuel cell, for example, a platinum-supported carbon catalyst-containing catalyst layer for the fuel cell can be used as the anode catalyst layer in place of the oxygen reduction catalyst.

The membrane-electrode assembly herein may be hereinafter occasionally referred to as "MEA."

As the polymer electrolyte membrane, for example, a polymer electrolyte membrane using a perfluorosulfonate-based polymer or a polymer electrolyte membrane using a hydrocarbon-based polymer is generally used. However, a membrane prepared by impregnating a liquid electrolyte into a polymer microporous membrane, a membrane prepared by filling a polymer electrolyte into a porous body, or the like may also be used.

The membrane-electrode assembly can be obtained by forming the catalyst layer for the fuel cell on an electrolyte membrane and/or a gas diffusion layer, and then interposing both sides of the electrolyte membrane with the gas diffusion layer by internally having the cathode catalyst layer and the anode catalyst layer, and for example, by hot pressing the resultant set.

<Use of Membrane-Electrode Assembly>

The membrane-electrode assembly can be preferably used in a fuel cell or air cell application due to high catalytic ability and catalytic durability.

A fuel cell is classified into several types according to a difference in an electrolyte to be used, or the like, and includes a molten carbonate fuel cell (MCFC), a phosphoric acid fuel cell (PAFC), a solid oxide fuel cell (SOFC) and a polymer electrolyte fuel cell (PEFC). Above all, the membrane-electrode assembly is preferably used for the polymer electrolyte fuel cell, and as fuel, hydrogen, methanol or the like can be used.

(Fuel Cell)

A fuel cell using the oxygen reduction catalyst has features of high performance, particularly satisfactory initial performance and excellent start-stop durability. Moreover, the fuel cell using the oxygen reduction catalyst according to the present invention has features of less expensiveness in comparison with a hitherto-known fuel cell using a platinum-supported carbon catalyst. The fuel cell can improve performance of an article equipped with the fuel cell and having at least one function selected from the group consisting of a power generating function, a light-emitting function, a heat generating function, a sound generating function, a movement function, a display function and a charging function.

<Specific Examples of Articles Equipped with the Fuel Cell>

Specific examples of the articles that can be equipped with the fuel cell include an architectural structure such as a building, a house and a tent, lighting equipment such as a fluorescent lamp, LED, organic EL, a streetlight, an interior lighting and a traffic light, a machinery, equipment for an automobile including a vehicle itself, home electric appliances, agricultural equipment, electronic equipment, a portable information terminal including a mobile phone, cosmetic equipment, a portable tool, sanitary equipment such as a bath article and a toilet article, furniture, a toy, an ornament, a notice board, a cooler box, an outdoor article such as an outdoor power generator, an educational material, an artificial flower, an object, a power source for a cardiac pacemaker, and a power source for a heater and cooler equipped with a Peltier device.

EXAMPLES

The present invention is described below in more detail by way of Examples, but the present invention is not limited thereto. Various kinds of measurement in Examples and Comparative Examples were performed by the methods described below.

[Analytical Method]
1. Elemental Analysis

Carbon: About 0.1 g of a sample was weighed and measured using EMIA-110, manufactured by HORIBA, Ltd.

Nitrogen and Oxygen: About 0.1 g of a sample was weighed, sealed into a Ni capsule, and then measured using TC600, manufactured by LECO Corporation.

Transition Metal Element (Titanium or the like): About 0.1 g of a sample was weighed in a platinum dish, and acid was added thereto to cause thermal decomposition. The thermally-decomposed material was adjusted to a fixed volume, and then appropriately diluted and quantitatively determined using ICP-OES (VISTA-PRO, manufactured by Seiko Instruments Inc.) or ICP-MS (HP7500, manufactured by Agilent Technologies, Inc.).

2. Powder X-Ray Diffractometry

Measurement of powder X-ray diffraction of a sample was performed using X'Pert MPD, manufactured by PANalytical B.V. Cu-Kα was used as an X-ray light source.

In powder X-ray diffraction of each sample, a signal that was detected with signal (S) to noise (N) ratio (S/N) of 2 or more was counted as one peak. Here, noise (N) was taken as a width of a baseline.

3. Raman Spectrometry

Micro-Raman measurement was performed using NRS-5100, manufactured by JASCO Corporation. Before measuring a sample, an apparatus was calibrated using a silicon substrate for reference. A sample was measured in a lattice measuring mode, and measurement on 9 places was taken as one measurement, and the sample was measured 5 times on different positions for each measurement (45 places in total). Spectra obtained in each measurement were averaged, and an average was taken as a final result. An excited wavelength was 532 nm. The exposure time and the number of cumulation were taken as 3 seconds and 5 times, respectively, per one place of laser irradiation point.

The spectra obtained were analyzed using Spectra Manager Version 2, manufactured by JASCO Corporation. More specifically, suitable baseline correction was conducted, and then peak fitting was made on the resulting spectrum in the range of 850 to 2,000 $cm^{-1}$ using four Lorentz functions having maxima at 1,340 $cm^{-1}$, 1,365 $cm^{-1}$, 1,580 $cm^{-1}$ and 1,610 $cm^{-1}$. An intensity ratio of a peak at 1,340 $cm^{-1}$ (D band) to a peak at 1,580 $cm^{-1}$ (G band) as obtained from the result was calculated as a D/G ratio.

4. BET Specific Surface Area Measurement 0.15 g of a sample was collected and subjected to specific surface area measurement using Fully Automatic BET Specific Surface Area Measurement Equipment Macsorb (manufactured by MOUNTECH Co., Ltd.). Pretreatment time and pretreatment temperature were set at 30 minutes and 200° C., respectively.

5. Transmission Electron Microscope Observation

Transmission electron microscope (TEM) observation was performed using H9500 (acceleration voltage: 300 kV)

manufactured by Hitachi, Ltd. A sample for observation was prepared by dispersing a sample powder into ethanol and then dripping the dispersion on a microgrid for TEM observation. Energy dispersive X-ray fluorescence analysis was also conducted using HD2300 (acceleration voltage: 200 kV), manufactured by Hitachi, Ltd.

Example 1

1-1. Preparation of Composite Particles

To a solution of 15 mL of ethanol (manufactured by Wako Pure Chemical Industries, Ltd.) and 5 mL of acetic acid (manufactured by Wako Pure Chemical Industries, Ltd.), 5 mL of titanium tetraisopropoxide (manufactured by JUNSEI CHEMICAL CO., LTD.) and 5 mL of acetylacetone (manufactured by JUNSEI CHEMICAL CO., LTD.) were added while stirring the resultant mixture at room temperature to prepare a titanium-containing mixture solution. Meanwhile, 3.76 g of glycine (manufactured by Wako Pure Chemical Industries, Ltd.) and 0.31 g of iron(II) acetate (manufactured by Sigma-Aldrich Corporation) were added to 20 mL of pure water, and the resultant mixture was stirred at room temperature to prepare a glycine-containing mixture solution into which the components were completely dissolved. The titanium-containing mixture solution was slowly added to the glycine-containing mixture solution to give a transparent catalyst precursor solution. A rotary evaporator was used to set a temperature of a water bath at about 80° C. to slowly evaporate a solvent while heating and stirring the catalyst precursor solution. A solid residue obtained by completely evaporating the solvent was uniformly and finely ground in a mortar to give powder.

The powder was put in a tubular furnace, heated to 900° C. at a heating rate of 10° C./min under an atmosphere of a hydrogen and nitrogen mixed gas containing 4 vol % of hydrogen, and heat-treated at 900° C. for 1 hour to give titanium- and iron-containing oxycarbonitride powder. The powder was subjected to planetary ball mill treatment in isopropanol (manufactured by JUNSEI CHEMICAL CO., LTD.), and then filtered, and the resultant residue was dried to give powder.

1-2. Hydrogen Peroxide Treatment

Then, 1.6 g of the powder was added to a mixed solution of 800 mL of distilled water and 800 mL of 30% hydrogen peroxide aqueous solution (manufactured by Kanto Chemical Co., Inc.) and allowed to react therewith at 25° C. for 2 hours while stirring the resultant mixture. Then, the mixture was filtered and the resultant residue was dried to give powder (hereinafter, also described as "catalyst (1)").

1-3. Platinum-Supporting Operation

In 1, 250 mL of distilled water, 1.00 g of catalyst (1) and 363 mg of sodium carbonate (manufactured by Wako Pure Chemical Industries, Ltd.) were put, and the resultant mixture was shaken for 30 minutes using an ultrasonic cleaner. The suspension was stirred for 30 minutes in a water bath while keeping a liquid temperature at 80° C. Here, 30 mL of distilled water containing 0.660 g chloroplatinic acid hexahydrate (manufactured by Wako Pure Chemical Industries, Ltd.) (equivalent to 0.250 g of platinum) was added dropwise over 10 minutes (a liquid temperature was kept at 80° C.). Then, the resultant mixture was stirred for 2 hours at a liquid temperature of 80° C. Next, 21.5 mL of 37% formaldehyde solution (manufactured by Wako Pure Chemical Industries, Ltd.) was added dropwise to the suspension over 5 minutes. Then, the resultant mixture was stirred for 1 hour at a liquid temperature of 80° C. After completion of the reaction, the suspension was cooled, and black powder was separated by filtration, and dried.

The powder obtained was put in a tubular furnace, heated to 800° C. at a heating rate of 10° C./min under an atmosphere of a hydrogen and nitrogen mixed gas containing 4 vol % of hydrogen, and heat-treated at 800° C. for 1 hour to give 20 mass % platinum-containing composite particles (hereinafter, also described as "composite catalyst (1)."

Each evaluation mentioned later was performed using catalyst (1) and composite catalyst (1).

Example 2

Catalyst (2) was prepared in a manner similar to 1-1 and 1-2 in Example 1 except that reaction time of hydrogen peroxide treatment was changed to 30 minutes. Further, a 20 mass % platinum-containing composite catalyst (hereinafter, also described as "composite catalyst (2)") was obtained in a manner similar to 1-3 in Example 1 except that catalyst (2) was used in place of catalyst (1).

Each evaluation mentioned later was performed using catalyst (2) and composite catalyst (2).

Example 3

Catalyst (3) was prepared in a manner similar to 1-1 and 1-2 in Example 1 except that reaction time of hydrogen peroxide treatment was changed to 8 hours. Further, a 20 mass % platinum-containing composite catalyst (hereinafter, also described as "composite catalyst (3)") was obtained in a manner similar to 1-3 in Example 1 except that catalyst (3) was used in place of catalyst (1).

Each evaluation mentioned later was performed using catalyst (3) and composite catalyst (3).

Example 4

Catalyst (4) was prepared in a manner similar to 1-1 and 1-2 in Example 1 except that a reaction temperature of hydrogen peroxide treatment was changed to 0° C. Further, a 20 mass % platinum-containing composite catalyst (hereinafter, also described as "composite catalyst (4)") was obtained in a manner similar to 1-3 in Example 1 except that catalyst (4) was used in place of catalyst (1).

Each evaluation mentioned later was performed using catalyst (4) and composite catalyst (4).

Example 5

5-1. Preparation of Composite Particles

To a solution of 15 mL of ethanol (manufactured by Wako Pure Chemical Industries, Ltd.) and 5 mL of acetic acid (manufactured by Wako Pure Chemical Industries, Ltd.), 5 mL of titanium tetraisopropoxide (manufactured by JUNSEI CHEMICAL CO., LTD.) and 5 mL of acetylacetone (manufactured by JUNSEI CHEMICAL CO., LTD.) were added while stirring the resultant mixture at room temperature to prepare a titanium-containing mixture solution. Meanwhile, 3.76 g of glycine (manufactured by Wako Pure Chemical Industries, Ltd.) and 0.31 g of iron(II) acetate (manufactured by Sigma-Aldrich Corporation) were added to 20 mL of pure water, and the resultant mixture was stirred at room temperature to prepare a glycine-containing mixture solution into which the components were completely dissolved. The titanium-containing mixture solution was slowly added to the glycine-containing mixture solution to give a transparent catalyst precursor solution. A rotary evaporator was used to set a temperature of a water bath at about 80° C. to slowly evaporate a solvent while heating and stirring the catalyst precursor solution. A solid residue obtained by completely evaporating the solvent was uniformly and finely ground in a mortar to give powder.

The powder was put in a tubular furnace, heated to 880° C. at a heating rate of 20° C./min under an atmosphere of a hydrogen and nitrogen mixed gas containing 4 vol % of hydrogen, which was further saturated with steam using a bubbler containing distilled water kept at 25° C., and heat-treated at 880° C. for 1 hour to give titanium- and iron-containing oxycarbonitride powder. The powder was subjected to planetary ball mill treatment in isopropanol (manufactured by JUNSEI CHEMICAL CO., LTD.), and then the resultant mixture was filtered, and the resultant residue was dried to give powder (hereinafter, also described as "catalyst (5)").

5-2. Platinum-Supporting Operation

Then, a 20 mass % platinum-containing composite catalyst (hereinafter, also described as "composite catalyst (5)") was obtained in a manner similar to 1-3 in Example 1 except that catalyst (5) was used in place of catalyst (1).

Each evaluation mentioned later was performed using catalyst (5) and composite catalyst (5).

Example 6

Catalyst (6) was prepared in a manner similar to 5-1 in Example 5 except that ammonium ferrocyanide (manufactured by Wako Pure Chemical Industries, Ltd.) was used in place of iron(II) acetate. Further, a 20 mass % platinum-containing composite catalyst (hereinafter, also described as "composite catalyst (6)") was obtained in a manner similar to 1-3 in Example 1 except that catalyst (6) was used in place of catalyst (1).

Each evaluation mentioned later was performed using catalyst (6) and composite catalyst (6).

Example 7

Catalyst (6) was prepared in a manner similar to Example 6. Next, catalyst (6) was subjected to hydrogen peroxide treatment in a manner similar to 1-2 in Example 1 to give catalyst (7). Further, a 20 mass % platinum-containing composite catalyst (hereinafter, also described as "composite catalyst (7)") was obtained in a manner similar to 1-3 in Example 1 except that catalyst (7) was used in place of catalyst (1).

Each evaluation mentioned later was performed using catalyst (7) and composite catalyst (7).

Example 8

Catalyst (7) was prepared in a manner similar to Example 7. Next, 1.00 g of catalyst (7) and 21 mL of 1.0 mol/L sodium hydroxide aqueous solution (manufactured by Wako Pure Chemical Industries, Ltd.) were added to 1,250 mL of distilled water, and the resultant mixture was shaken for 30 minutes using an ultrasonic cleaner. The suspension was stirred for 30 minutes while keeping a liquid temperature at 80° C. in a water bath. Here, 30 mL of distilled water containing 0.718 g chloroplatinic acid hexahydrate (equivalent to 0.270 g of platinum) (manufactured by Wako Pure Chemical Industries, Ltd.) and 0.330 g cobalt(II) chloride hexahydrate (equivalent to 81.7 mg of cobalt) (manufactured by Kanto Chemical Co., Inc.) was added dropwise over 10 minutes (a liquid temperature was kept at 80° C.).

Then, the resultant mixture was stirred at a liquid temperature of 80° C. for 2 hours. Next, 100 mL of distilled water containing 1.00 g of sodium hydroborate (manufactured by Wako Pure Chemical Industries, Ltd.) was added dropwise to the suspension over 10 minutes. Then, the resultant mixture was stirred at a liquid temperature of 80° C. for 1 hour. After completion of the reaction, the suspension was cooled, and black powder was separated by filtration and dried.

The powder obtained was put in a tubular furnace, heated to 600° C. at a heating rate of 10° C./min under an atmosphere of a hydrogen and nitrogen mixed gas containing 4 vol % of hydrogen, and heat-treated at 600° C. for 1 hour to give a platinum- and cobalt-containing composite catalyst (hereinafter, also described as "composite catalyst (8)") containing 20 mass % platinum and having platinum and cobalt alloyed at a mole ratio of 1:1.

Each evaluation mentioned later was performed using catalyst (7) and composite catalyst (8).

Example 9

Catalyst (7) was prepared in a manner similar to Example 7. Next, 1.00 g of catalyst (7) and 21 mL of 1.0 mol/L sodium hydroxide aqueous solution (manufactured by Wako Pure Chemical Industries, Ltd.) were added to 1,250 mL of distilled water, and the resultant mixture was shaken for 30 minutes using an ultrasonic cleaner. The suspension was stirred for 30 minutes while keeping a liquid temperature at 80° C. in a water bath. Here, 30 mL of distilled water containing 0.718 g chloroplatinic acid hexahydrate (equivalent to 0.270 g of platinum) (manufactured by Wako Pure Chemical Industries, Ltd.) and 0.331 g nickel(II) chloride hexahydrate (equivalent to 81.7 mg of nickel) (manufactured by Wako Pure Chemical Industries, Ltd.) was added dropwise over 10 minutes (a liquid temperature was kept at 80° C.) Then, the resultant mixture was stirred at a liquid temperature of 80° C. for 2 hours. Next, 100 mL of distilled water containing 1.00 g of sodium hydroborate (manufactured by Wako Pure Chemical Industries, Ltd.) was added dropwise to the suspension over 10 minutes. Then, the resultant mixture was stirred at a liquid temperature of 80° C. for 1 hour. After completion of the reaction, the suspension was cooled, and black powder was separated by filtration and dried.

The powder obtained was put in a tubular furnace, heated to 600° C. at a heating rate of 10° C./min under an atmosphere of a hydrogen and nitrogen mixed gas containing 4 vol % of hydrogen, and heat-treated at 600° C. for 1 hour to give a platinum- and nickel-containing composite catalyst (hereinafter, also described as "composite catalyst (9)") containing 20 mass % platinum and having platinum and nickel alloyed at a mole ratio of 1:1.

Each evaluation mentioned later was performed using catalyst (7) and composite catalyst (9).

Comparative Example 1

1-1. Preparation of Composite Particles

To a solution of 15 mL of ethanol (manufactured by Wako Pure Chemical Industries, Ltd.) and 5 mL of acetic acid (manufactured by Wako Pure Chemical Industries, Ltd.), 5 mL of titanium tetraisopropoxide (manufactured by JUNSEI CHEMICAL CO., LTD.) and 5 mL of acetylacetone (manufactured by JUNSEI CHEMICAL CO., LTD.) were added while stirring the resultant mixture at room temperature to prepare a titanium-containing mixture solution. Meanwhile, 3.76 g of glycine (manufactured by Wako Pure Chemical Industries, Ltd.) was added to 20 mL of pure water, and the resultant mixture was stirred at room temperature to prepare a glycine-containing mixture solution into which the components were completely dissolved. The titanium-containing mixture solution was slowly added to the glycine-containing mixture solution to give a transparent catalyst precursor solution. A rotary evaporator was used to set a temperature of a water bath at about 80° C. to slowly evaporate a solvent while heating and stirring the catalyst precursor solution. A solid residue obtained by completely evaporating the solvent was uniformly and finely ground in a mortar to give powder.

The powder was put in a tubular furnace, heated to 900° C. at a heating rate of 10° C./min under an atmosphere of a hydrogen and nitrogen mixed gas containing 4 vol % of hydrogen, and heat-treated at 900° C. for 1 hour to give titanium-containing oxycarbonitride powder. The powder was subjected to planetary ball mill treatment in isopropanol (manufactured by JUNSEI CHEMICAL CO., LTD.), and then the resultant mixture was filtered and the resultant residue was dried to give powder (hereinafter, also described as "catalyst (8)").

1-2. Platinum-Supporting Operation

Then, a 20 mass % platinum-containing composite catalyst (hereinafter, also described as "composite catalyst (10)") was obtained in a manner similar to 1-3 in Example 1 except that catalyst (8) was used in place of catalyst (1).

Each evaluation mentioned later was performed using catalyst (8) and composite catalyst (10).

Comparative Example 2

2-1. Preparation of Composite Particles

To a solution of 15 mL of ethanol (manufactured by Wako Pure Chemical Industries, Ltd.) and 5 mL of acetic acid (manufactured by Wako Pure Chemical Industries, Ltd.), 5 mL of titanium tetraisopropoxide (manufactured by JUNSEI CHEMICAL CO., LTD.) and 5 mL of acetylacetone (manufactured by JUNSEI CHEMICAL CO., LTD.) were added while stirring the resultant mixture at room temperature to prepare a titanium-containing mixture solution. Meanwhile, 3.76 g of glycine (manufactured by Wako Pure Chemical Industries, Ltd.) and 0.31 g of iron(II) acetate (manufactured by Sigma-Aldrich Corporation) were added to 20 mL of pure water, and the resultant mixture was stirred at room temperature to prepare a glycine-containing mixture solution into which the components were completely dissolved. The titanium-containing mixture solution was slowly added to the glycine-containing mixture solution to give a transparent catalyst precursor solution. A rotary evaporator was used to set a temperature of a water bath at about 80° C. to slowly evaporate a solvent while heating and stirring the catalyst precursor solution. A solid residue obtained by completely evaporating the solvent was uniformly and finely ground in a mortar to give powder.

The powder was put in a tubular furnace, heated to 900° C. at a heating rate of 10° C./min under an atmosphere of a hydrogen and nitrogen mixed gas containing 4 vol % of hydrogen, and heat-treated at 900° C. for 1 hour to give titanium- and iron-containing oxycarbonitride powder. The powder was subjected to planetary ball mill treatment in isopropanol (manufactured by JUNSEI CHEMICAL CO., LTD.), and then the resultant mixture was filtered and the resultant residue was dried to give powder (hereinafter, also described as "catalyst (9)").

2-2. Platinum-Supporting Operation

Then, a 20 mass % platinum-containing composite catalyst (hereinafter, also described as "composite catalyst (11)") was obtained in a manner similar to 1-3 in Example 1 except that catalyst (9) was used in place of catalyst (1).

Each evaluation mentioned later was performed using catalyst (9) and composite catalyst (11).

Comparative Example 3

Catalyst (10) was prepared in a manner similar to 2-1 in Comparative Example 2 except that the tubular furnace during heat treatment was changed to an infrared gold image furnace manufactured by ULVAC-RIKO, Inc. and a heat treatment temperature was changed to 1,100° C. in place of 900° C. Further, a 20 mass % platinum-containing composite catalyst (hereinafter, also described as "composite catalyst (12)") was obtained in a manner similar to 1-3 in Example 1 except that catalyst (10) was used in place of catalyst (1).

Each evaluation mentioned later was performed using catalyst (10) and composite catalyst (12).

Comparative Example 4

Catalyst (11) was prepared in a manner similar to 1-1 and 1-2 in Example 1 except that a reaction temperature of hydrogen peroxide treatment was changed to 40° C. Further, a 20 mass % platinum-containing composite catalyst (hereinafter, also described as "composite catalyst (13)") was obtained in a manner similar to 1-3 in Example 1 except that catalyst (11) was used in place of catalyst (1).

Each evaluation mentioned later was performed using catalyst (11) and composite catalyst (13).

Comparative Example 5

Catalyst (12) was prepared in a manner similar to 1-1 and 1-2 in Example 1 except that a reaction temperature of hydrogen peroxide treatment was changed to 60° C. Further, a 20 mass % platinum-containing composite catalyst (hereinafter, also described as "composite catalyst (14)") was obtained in a manner similar to 1-3 in Example 1 except that catalyst (12) was used in place of catalyst (1).

Each evaluation mentioned later was performed using catalyst (12) and composite catalyst (14).

Comparative Example 6

Catalyst (13) was prepared in a manner similar to 1-1 and 1-2 in Example 1 except that a reaction temperature of hydrogen peroxide treatment was changed to 100° C. Further, a 20 mass % platinum-containing composite catalyst (hereinafter, also described as "composite catalyst (15)") was obtained in a manner similar to 1-3 in Example 1 except that catalyst (13) was used in place of catalyst (1).

Each evaluation mentioned later was performed using catalyst (13) and composite catalyst (15).

Comparative Example 7

7-1. Preparation of Composite Particles 5.10 g of titanium carbide (manufactured by Soekawa Chemical Co., Ltd.), 0.80 g of titanium oxide (manufactured by Wako Pure Chemical Industries, Ltd.) and 0.31 g of titanium nitride (manufactured by Soekawa Chemical Co., Ltd.) were sufficiently mixed, and the resultant mixture was heated at 1,800° C. for 3 hours under a nitrogen atmosphere to give titanium carbonitride powder. The powder was formed into a sintered body, and therefore ground with an automatic mortar.

The titanium carbonitride powder was heated at 1,000° C. for 10 hours in a tubular furnace while flowing a hydrogen and nitrogen mixed gas containing 4 vol % of hydrogen, which further contained vol % of oxygen gas, to give titanium oxycarbonitride (hereinafter, also described as "catalyst (14)").

7-2. Platinum-Supporting Operation

Then, a 20 mass % platinum-containing composite catalyst (hereinafter, also described as "composite catalyst (16)") was obtained in a manner similar to 1-3 in Example 1 except that catalyst (14) was used in place of catalyst (1).

Each evaluation mentioned later was performed using catalyst (14) and composite catalyst (16).

Comparative Example 8

A 20 mass % platinum-containing composite catalyst (hereinafter, also described as "composite catalyst (17)") was obtained in a manner similar to 1-3 in Example 1 except that rutile type titanium oxide (manufactured by Wako Pure Chemical Industries, Ltd., hereinafter, also described as "catalyst (15)") was used in place of catalyst (1).

Each evaluation mentioned later was performed using catalyst (15) and composite catalyst (17).

Comparative Example 9

A 20 mass % platinum-containing composite catalyst (hereinafter, also described as "composite catalyst (18)") was obtained in a manner similar to 1-3 in Example 1 except that titanium carbide (manufactured by Soekawa Chemical Co., Ltd., hereinafter, also described as "catalyst (16)") was used in place of catalyst (1).

Each evaluation mentioned later was performed using catalyst (16) and composite catalyst (18).

Comparative Example 10

A 20 mass % platinum-containing composite catalyst (hereinafter, also described as "composite catalyst (19)") was obtained in a manner similar to 1-3 in Example 1 except that titanium nitride (manufactured by Soekawa Chemical Co., Ltd., hereinafter, also described as "catalyst (17)") was used in place of catalyst (1).

Each evaluation mentioned later was performed using catalyst (17) and composite catalyst (19).

Comparative Example 11

A 20 mass % platinum-containing composite catalyst (hereinafter, also described as "composite catalyst (20)") was obtained in a manner similar to 1-3 in Example 1 except that titanium carbonitride (manufactured by A.L.M.T. Corporation, hereinafter, also described as "catalyst (18)") was used in place of catalyst (1).

Each evaluation mentioned later was performed using catalyst (18) and composite catalyst (20).

Comparative Example 12

12-1. Preparation of Composite Particles

To a heating tube set at 160° C., titanium tetrachloride (manufactured by JUNSEI CHEMICAL CO., LTD.) was supplied at 6 g/h, and a nitrogen gas was further supplied at 1 L/min thereto to give mixed gas (1) of a titanium tetrachloride gas and the nitrogen gas. The mixed gas (1) was supplied to reactor (1) as shown in FIG. 1.

To a heating tube set at 120° C., water was supplied at 0.1 g/h, and a nitrogen gas was further supplied at 100 mL/min thereto to give mixed gas (2) of steam and the nitrogen gas.

Mixed gas (4) of the mixed gas (2) and mixed gas (3) obtained by diluting, with a nitrogen gas at 100 mL/min, an ammonia gas at 6 standard cc/min (hereinafter, described as "sccm") and a methane gas at 60 sccm was supplied to reactor (1) as shown in FIG. 1. Reactor (1) was warmed to 1,200° C. from outside to perform a reaction among the titanium tetrachloride gas, the ammonia gas, the methane gas and steam.

After the reaction, a black-gray product obtained was collected using an extraction thimble, washed with water, and then dried in vacuum to give titanium-containing oxycarbonitride powder (hereinafter, also described as "catalyst (19)").

12-2. Platinum-Supporting Operation

Then, a 20 mass % platinum-containing composite catalyst (hereinafter, also described as "composite catalyst (21)") was obtained in a manner similar to 1-3 in Example 1 except that catalyst (19) was used in place of catalyst (1).

Each evaluation mentioned later was performed using catalyst (19) and composite catalyst (21).

Comparative Example 13

A platinum-supported carbon catalyst (TEC10E50E) manufactured by Tanaka Kikinzoku Kogyo was used for each evaluation as mentioned later in place of the composite catalyst. The platinum-supported carbon catalyst is hereinafter described as Pt/C. A D/G ratio of the platinum-supported carbon catalyst Pt/C was 1.13, and a BET specific surface area thereof was 344 $m^2/g$.

Comparative Example 14

A carbonized material IK(Co)1000° CAW was synthesized according to Example 1 in Patent Literature 1. Then, a 20 mass % platinum-containing composite catalyst (hereinafter, also described as "composite catalyst (22)") was obtained in a manner similar to 1-3 in Example 1 except that the carbonized material (hereinafter, also described as catalyst (20)) was used in place of catalyst (1).

Elementary analysis results of catalyst (20) obtained showed that the content of cobalt, carbon, nitrogen and oxygen was 0.83, 95, 0.5 and 0.90% by mass, respectively.

A D/G ratio of catalyst (20) obtained was 0.63, and a BET specific surface area thereof was 178 $m^2/g$.

Each evaluation mentioned later was performed using catalyst (20) and composite catalyst (22).

Comparative Example 15

Catalyst (21) was prepared in a manner similar to 2-1 in Comparative Example 2 except that titanium tetraisopropoxide was not added thereto. Then, a 20 mass % platinum-containing composite catalyst (hereinafter, also described as "composite catalyst (23)") was obtained in a manner similar to 1-3 in Example 1 except that catalyst (21) was used in place of catalyst (1).

Elementary analysis results of catalyst (21) obtained showed that the content of iron, carbon, nitrogen and oxygen was 8.5, 78, 1.6 and 8.2% by mass, respectively.

A D/G ratio of Catalyst (21) obtained was 1.13, and a BET specific surface area thereof was 286 m$^2$/g.

Each evaluation mentioned later was performed using catalyst (21) and composite catalyst (23).

Comparative Example 16

Catalyst (22) was prepared in a manner similar to 1-1 and 1-2 in Example 1 except that titanium tetraisopropoxide was not added thereto. Then, a 20 mass % platinum-containing composite catalyst (hereinafter, also described as "composite catalyst (24)") was obtained in a manner similar to 1-3 in Example 1 except that catalyst (22) was used in place of catalyst (1).

Elementary analysis results of Catalyst (22) obtained showed that the content of iron, carbon, nitrogen and oxygen was 8.6, 80, 1.2 and 7.3% by mass, respectively.

A D/G ratio of Catalyst (22) obtained was 1.03, and a BET specific surface area thereof was 287 m$^2$/g.

Each evaluation mentioned later was performed using catalyst (22) and composite catalyst (24).

[Transmission Electron Microscope Observation]

Figure 2:
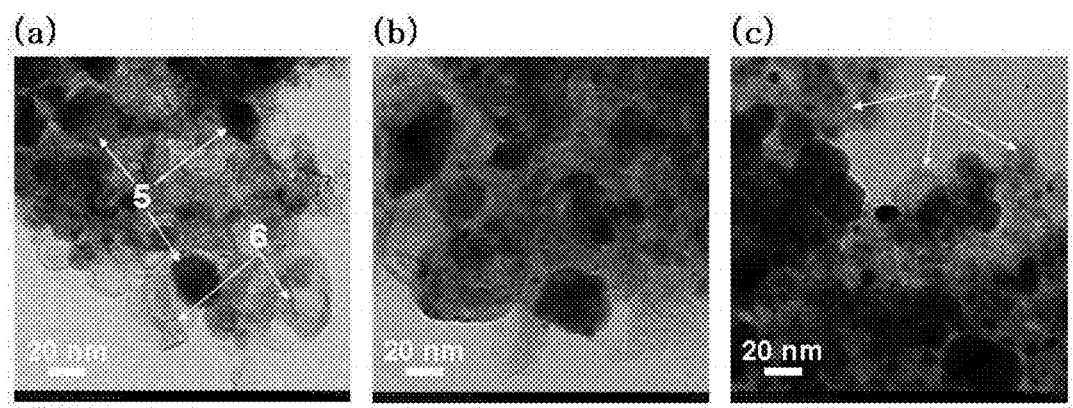
FIG. 2(a) is a diagram showing a transmission electron microscope image of a catalyst (1) obtained in Example 1.
FIG. 2(b) is a diagram showing a transmission electron microscope image of a catalyst (6) obtained in Example 6.
FIG. 2(c) is a diagram showing a transmission electron microscope image of a catalyst (9) obtained in Comparative Example 2.

FIGS. 2(a), 2(b) and 2(c) show transmission electron microscope (TEM) observation images of catalyst (1), catalyst (6) and catalyst (9), respectively. In FIG. 2, "5" shows primary particles of a titanium compound, "6" shows graphite-like carbon and "7" shows amorphous-like carbon. According to the TEM observation and energy dispersive X-ray fluorescence analysis, the primary particles of the titanium compound were observed together with a graphite-like or amorphous-like carbon structure in any support. Here, no secondary agglomeration of the primary particles of the titanium compound was observed, and an aspect was confirmed in which the primary particles of the titanium compound are dispersed in the carbon structure. A noteworthy fact is a further decrease in amorphous-like carbon and clearer observation of graphite-like carbon in catalyst (1) and catalyst (6) in comparison with catalyst (9). A similar trend was confirmed also in catalyst (2) to catalyst (5), and catalyst (7).

[Powder X-Ray Diffraction]

Figure 3:
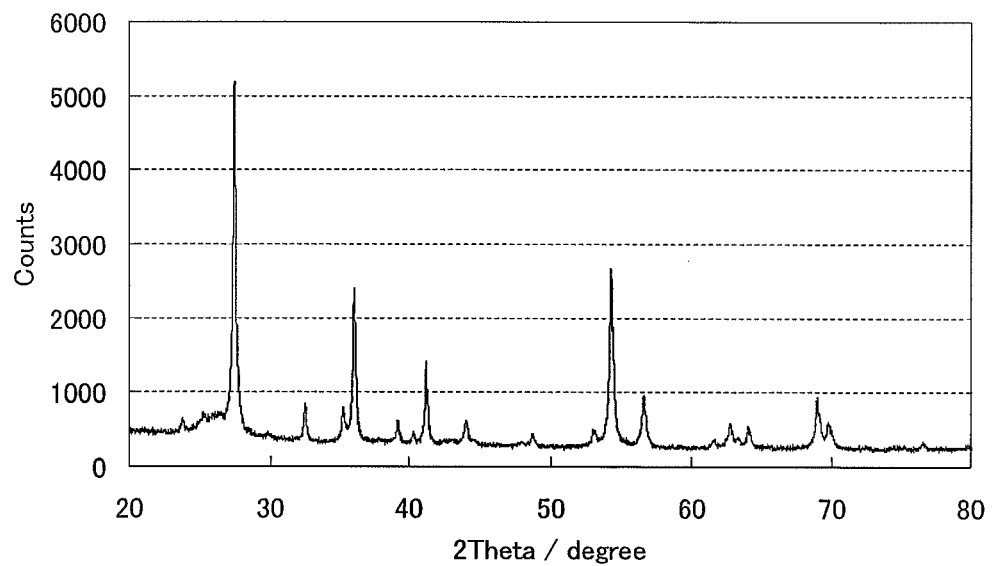
FIG. 3 is a diagram showing a powder X-ray diffraction pattern of a catalyst (1) obtained in Example 1.

FIG. 3 shows a powder X-ray diffraction (XRD) pattern of catalyst (1) using Cu-Kα as an X-ray light source. A main phase of catalyst (1) was identified to be rutile type titanium oxide in comparison with an XRD pattern of a standard sample rutile type TiO$_2$ (manufactured by Wako Pure Chemical Industries, Ltd.) which was measured as a reference system. Here, catalyst (1) and rutile type TiO$_2$ meet the conditions described below. More specifically, catalyst (1) and rutile type TiO$_2$ have a peak in each of areas A to D in the 2θ range described below:

A: 26 to 28°;
B: 35 to 37°;
C: 40 to 42°; and
D: 53 to 55°, and have a peak with the highest intensity of all the peaks that appear in the diffraction pattern in the area A. In XRD patterns of catalyst (2) to catalyst (7), too, a diffraction peak group similar to the peaks of catalyst (1) to meet the conditions described above was observed, and a main phase thereof was identified to be titanium oxide having rutile structure.

[X-Ray Absorption Spectroscopy]

X-ray absorption spectroscopy (XAS) measurement of catalyst (1) to catalyst (7) was performed in the synchrotron radiation facility SPring-8. In a transmission X-ray absorption fine structure analysis (transmission XAFS) of titanium, a threshold of X-ray absorption had a value between TiO$_2$ (titanium valence: 4) and Ti$_2$O$_3$ (titanium valence: 3), which were standard samples measured as a reference system. The valence of titanium contained in catalyst (1) to catalyst (7) was estimated to be 3.0 or more and less than 4.0 from the results.

[Elementary Analysis and Raman Measurement]

Table 1 shows results of elementary analysis, an intensity ratio (D/G ratio) of a peak near 1,340 cm$^{-1}$ (D band) to a peak near 1,580 cm$^{-1}$ (G band) as obtained by peak fitting of Raman spectrum, and a specific surface area calculated by a BET method of catalyst (1) to catalyst (19).

A ratio of number of atoms of carbon, nitrogen, oxygen and M2 to titanium as contained in catalyst (1) to catalyst (7) related to each Example is within the preferred range as mentioned above.

A D/G ratio of catalyst (1) to catalyst (7) related to each Example is within the range of 0.4 to 1.0.

A specific surface area calculated by the BET method is within the range of 150 to 600 m$^2$/g for catalyst (1) to catalyst (7) related to each Example.

[Production of Membrane-Electrode Assembly for Fuel Cell and Evaluation of Power Generation Characteristics]

1. Preparation of Ink for Cathode 33.7 mg of composite catalyst (1) prepared in Example 1, and as an electron-conductive material, 8.43 mg of graphitized carbon black (GrCB-K, manufactured by Showa Denko K. K.) were mixed, and 0.506 g of aqueous solution (5% NAFION® aqueous solution, manufactured by Wako Pure Chemical Industries, Ltd.) containing 25.3 mg of a proton conductive material (NAFION®), 2.3 mL of pure water and 2.3 mL of isopropanol (manufactured by JUNSEI CHEMICAL CO., LTD.) were further added thereto, and the resultant mixture was irradiated with an ultrasonic wave for 30 minutes in ice water to prepare ink (1) for cathode.

Ink (2) for cathode to ink (7) for cathode, and ink (10) for cathode to ink (21) for cathode were prepared using composite catalyst (2) to composite catalyst (7) and composite catalyst (10) to composite catalyst (21) in a similar manner as described above, respectively.

Then, 60.0 mg of composite catalyst (8) prepared in Example 8 was added to 0.120 g of aqueous solution (5% NAFION® aqueous solution, manufactured by Wako Pure Chemical Industries, Ltd.) containing 6.0 mg of a proton conductive material (NAFION®). 3.36 mL of pure water and 3.36 mL of isopropanol (manufactured by JUNSEI CHEMICAL CO., LTD.) were further added thereto, and the resultant mixture was irradiated with an ultrasonic wave for 30 minutes in ice water to prepare ink (8) for cathode.

Ink (9) for cathode and ink (22) for cathode were prepared using composite catalyst (9) and composite catalyst (22) in a similar manner as described above. Further, ink (23) for cathode was prepared using composite catalyst (7) in a similar manner as described above.

Then, 90.0 mg of Pt/C (TEC10E50E, manufactured by Tanaka Kikinzoku Kogyo) described above was added to 0.75 g of aqueous solution (5% NAFION® aqueous solution, manufactured by Wako Pure Chemical Industries, Ltd.) containing 37.5 mg of a proton conductive material (NAFION®). 3.75 mL of pure water and 3.75 mL of isopropanol (manufactured by JUNSEI CHEMICAL CO., LTD.) were further added thereto, and the resultant mixture was irradiated with an ultrasonic wave for 30 minutes in ice water to prepare ink (Pt/C) for cathode.

2. Preparation of Cathode Electrode Having Catalyst Layer for Fuel Cell

A gas diffusion layer (carbon paper (TGP-H-060, manufactured by Toray Industries, Inc.)) was immersed into acetone (manufactured by Wako Pure Chemical Industries, Ltd.) for 30 seconds and degreased, and then dried, and subsequently immersed into a 10% polytetrafluoroethylene (PTFE) aqueous solution for 30 seconds.

An immersed material was dried at room temperature, and then heated at 350° C. for 1 hour to give a gas diffusion layer (hereinafter, also described as "GDL") having water repellency in which PTFE was dispersed inside the carbon paper.

Next, ink (1) for cathode was applied at 80° C., using an automatic spray coating system (manufactured by SAN-EI TECH Ltd.), onto a surface of the GDL cut into a size of 5 cm×5 cm to prepare an electrode (hereinafter, also referred to as "cathode (1)") having, on a GDL surface, a cathode catalyst layer having 0.625 mg/cm$^2$ per unit area in a total amount of catalyst (1) and graphitized carbon black.

Cathode (2) to cathode (7), and cathode (10) to cathode (21) were prepared using ink (2) for cathode to ink (7) for cathode, and ink (10) for cathode to ink (21) for cathode in a similar manner as described above, respectively.

Meanwhile, ink (8) for cathode was applied at 80° C., using an automatic spray coating system (manufactured by SAN-EI TECH Ltd.), onto a surface of the GDL cut into a size of 5 cm×5 cm to prepare an electrode (hereinafter, also described as "cathode (8)") having, on a GDL surface, a cathode catalyst layer having 0.500 mg/cm$^2$ per unit area in a total amount of catalyst (8).

Cathode (9), cathode (22) and cathode (23) were prepared using ink (9) for cathode, ink (22) for cathode and ink (23) for cathode in a similar manner as described above, respectively.

Moreover, ink (Pt/C) for cathode was applied at 80° C., using an automatic spray coating system (manufactured by SAN-EI TECH Ltd.), onto a surface of the GDL cut into a size of 5 cm×5 cm to prepare an electrode (hereinafter, also referred to as "cathode (Pt/C)") having, on a GDL surface, a cathode catalyst layer having 0.200 mg/cm$^2$ per unit area in a total amount of the Pt/C.

An amount of noble metal per unit area in each cathode described above was adjusted to 0.1 mg/cm$^2$.

3. Preparation of Ink for Anode

In 50 mL of pure water, 0.6 g of platinum-supported carbon catalyst (TEC10E70TPM, manufactured by Tanaka Kikinzoku Kogyo) and 5 g of aqueous solution (5% NAFION® aqueous solution, manufactured by Wako Pure Chemical Industries, Ltd.) containing 0.25 g of a proton conductive material (NAFION®) were put, and the resultant mixture was mixed for 1 hour using an ultrasonic disperser to prepare ink (1) for anode.

4. Preparation of Anode Electrode Having Catalyst Layer for Fuel Cell

A gas diffusion layer (carbon paper (TGP-H-060, manufactured by Toray Industries, Inc.)) was immersed into acetone (manufactured by Wako Pure Chemical Industries, Ltd.) for 30 seconds and degreased, and then dried, and subsequently immersed into a 10% polytetrafluoroethylene (PTFE) aqueous solution for 30 seconds.

An immersed material was dried at room temperature, and then heated at 350° C. for 1 hour to give a gas diffusion layer (hereinafter, also described as "GDL") having water repellency in which PTFE was dispersed inside the carbon paper.

Next, ink (1) for anode was applied at 80° C., using an automatic spray coating system (manufactured by SAN-EI TECH Ltd.), onto a surface of the GDL cut into a size of 5 cm×5 cm to prepare an electrode (hereinafter, also referred to as "anode (1)") having, on a GDL surface, a cathode catalyst layer having 1.00 mg/cm$^2$ per unit area in a total amount of platinum-supported carbon catalyst.

5. Preparation of Membrane-Electrode Assembly for Fuel Cell

As an electrolyte membrane, a NAFION® membrane (NR-212, manufactured by DuPont), as cathode, cathode (1), and as anode, anode (1) were arranged, respectively.

A membrane-electrode assembly (hereinafter, also referred to as "MEA") prepared by arranging the electrolyte membrane between the cathode and the anode was prepared as described below.

The electrolyte membrane was interposed between cathode (1) and anode (1), and the resultant set was hot-pressed at a temperature of 140° C. and a pressure of 1 MPa over 7 minutes using a hot press machine so as for a cathode catalyst layer (1) and an anode catalyst layer (1) to adhere onto the electrolyte membrane to prepare MEA (1).

MEA (2) to MEA (23), and MEA (Pt/C) were prepared using cathode (2) to cathode (23), and cathode (Pt/C) in a similar manner as described above, respectively.

6. Preparation of Single Cell

MEA (1) prepared in Item 5 described above was interposed between two sealants (gaskets), two separators with gas channels, two current collectors and two rubber heaters, and fixed using a bolt, and the resultant set was fastened so as to reach predetermined contact pressure (4N) to prepare a single cell (hereinafter, also referred to as "single cell (1)") (cell area: cm$^2$) of a polymer electrolyte fuel cell.

Single cell (2) to single cell (23), and single cell (Pt/C) were prepared using MEA (2) to MEA (23), and MEA (Pt/C) in a similar manner as described above, respectively.

Single cell (24) was prepared in a manner entirely similar to single cell (1) except that composite catalyst (23) was used in place of composite catalyst (1).

Single cell (25) was prepared in a manner entirely similar to single cell (1) except that composite catalyst (24) was used in place of composite catalyst (1).

7. Start-Stop Durability Test

Temperature was adjusted at 80° C. for single cell (1), 80° C. for an anode humidifier, and 80° C. for a cathode humidifier. Then, hydrogen as fuel was supplied on an anode side, air was supplied on a cathode side, respectively, and electric current-voltage (I-V) characteristics of single cell (1) were evaluated.

Figure 4:
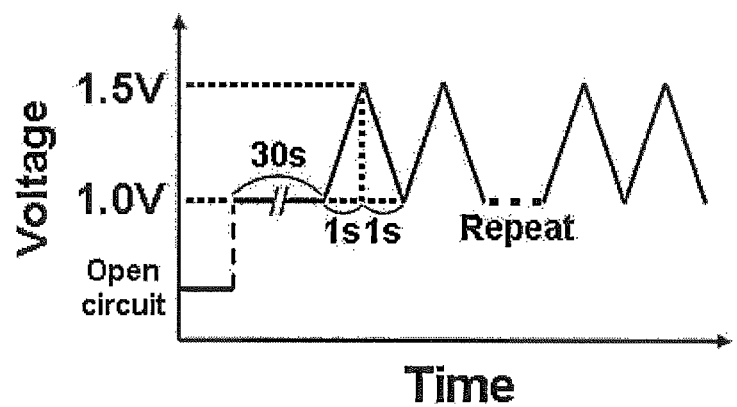
FIG. 4 is a diagram showing a relation between time and voltage representing a triangular wave potential cycle applied in a start-stop durability test.

Then, under conditions of temperature adjusted at 80° C. for single cell (1), 80° C. for the anode humidifier and 80° C. for the cathode humidifier, while supplying hydrogen on the anode side and nitrogen on the cathode side, respectively, triangular wave potential cycles including 1.0 V to 1.5 V, and 1.5 V to 1.0 V as shown in FIG. 4 were applied thereto 20,000 times.

After the triangular wave potential cycles were applied thereto 20,000 times, I-V measurement was performed under the conditions mentioned above.

A start-stop test in a similar manner as described above was conducted using single cell (2) to single cell (25), and single cell (Pt/C).

[Results of Start-Stop Test for Membrane-Electrode Assembly for Fuel Cell]

In the start-stop test describe above, a ratio (%) is defined as a voltage holding ratio for the ratio of a voltage value at 0.3 A/cm² as obtained from the I-V measurement after applying the triangular wave potential cycles 20,000 times to a voltage value (hereinafter, also described as "initial voltage") at 0.3 A/cm² as obtained from the I-V measurement before applying the triangular wave potential cycle.

In the I-V characteristics of the fuel cell, a voltage value at certain fixed current density serves as an index of performance of the fuel cell. More specifically, higher initial voltage means higher initial performance of the fuel cell, and eventually higher activity of the oxygen reduction catalyst. Moreover, a higher voltage holding ratio shows higher start-stop durability of the fuel cell, and eventually higher start-stop durability of the oxygen reduction catalyst.

Table 2 shows the initial voltage at 0.3 A/cm², and the voltage holding ratio at 0.3 A/cm² after applying the triangular wave potential cycles 20,000 times as obtained from the start-stop test.

Single cell (1) to single cell (9), and single cell (23) related to each Example had 0.5 V or more of the initial voltage at 0.3 A/cm² to show satisfactory initial performance. In particular, single cell (7) related to Example 7 showed higher initial performance in comparison with single cell (Pt/C) using Pt/C related to Comparative Example 13.

Further, single cell (1) to single cell (9), and single cell (23) related to each Example had a voltage holding ratio of 60% or more at 0.3 A/cm² after applying the triangular wave potential cycles 20,000 times to show satisfactory start-stop durability. A noteworthy fact is substantiation of a higher voltage holding ratio in any one of Examples in comparison with single cell (Pt/C) using Pt/C related to Comparative Example 13. In particular, single cell (7) to single cell (9), and single cell (23) related to Examples 7 to 9 showed a voltage holding ratio as very high as 80% or more.

From the results described above, the oxygen reduction catalyst prepared in each Example may be safely said to have satisfactory initial performance, and excellent start-stop durability.

TABLE 1-1

| | Catalyst | Element Composition* Ti | Fe | C | N | O | D/G ratio | BET specific surface area (m²/g) |
|---|---|---|---|---|---|---|---|---|
| Example 1 | (1) | 1 / 41.7 | 0.09 / 4.49 | 2.58 / 27 | 0.16 / 2.00 | 1.44 / 20 | 0.88 | 237 |
| Example 2 | (2) | 1 / 41.5 | 0.09 / 4.32 | 2.69 / 28.0 | 0.18 / 2.2 | 1.37 / 19.0 | 0.83 | 225 |
| Example 3 | (3) | 1 / 40.3 | 0.09 / 4.42 | 2.57 / 26.0 | 0.16 / 1.9 | 1.56 / 21.0 | 0.81 | 186 |
| Example 4 | (4) | 1 / 42.4 | 0.09 / 4.50 | 2.73 / 29.0 | 0.17 / 2.1 | 1.34 / 19.0 | 0.99 | 228 |
| Example 5 | (5) | 1 / 32.9 | 0.11 / 4.05 | 4.00 / 33 | 0.04 / 0.37 | 2.09 / 23 | 0.83 | 192 |
| Example 6 | (6) | 1 / 37.4 | 0.11 / 4.61 | 3.30 / 31 | 0.02 / 0.27 | 1.92 / 24 | 0.82 | 176 |
| Example 7 | (7) | 1 / 35.7 | 0.11 / 4.40 | 3.24 / 29 | 0.03 / 0.32 | 2.10 / 25 | 0.74 | 166 |
| Example 8 | (7) | Same as above | | | | | Same as above | Same as above |
| Example 9 | (7) | Same as above | | | | | Same as above | Same as above |
| Comparative Example 1 | (8) | 1 / 47.9 | — | 2.35 / 28.2 | 0.05 / 0.70 | 1.40 / 22.4 | 1.18 | 273 |
| Comparative Example 2 | (9) | 1 / 40.9 | 0.10 / 4.60 | 2.83 / 29 | 0.18 / 2.10 | 1.39 / 19 | 1.09 | 221 |
| Comparative Example 3 | (10) | 1 / 46.6 | 0.10 / 5.29 | 1.62 / 19 | 0.23 / 3.18 | 1.16 / 18 | 1.39 | 257 |
| Comparative Example 4 | (11) | 1 / 38.9 | 0.10 / 4.50 | 2.77 / 27.0 | 0.16 / 1.8 | 1.85 / 24.0 | 1.07 | 231 |
| Comparative Example 5 | (12) | 1 / 34.5 | 0.11 / 4.30 | 3.00 / 26 | 0.14 / 1.40 | 2.69 / 31 | 1.32 | 86 |
| Comparative Example 6 | (13) | 1 / 35.7 | 0.11 / 4.40 | 2.79 / 25 | 0.15 / 1.60 | 2.77 / 33 | 2.17 | 83 |
| Comparative Example 7 | (14) | 1 / 61.7 | — | 0.10 / 1.53 | 0.01 / 0.25 | 1.84 / 37.9 | 1.10 | 4.2 |
| Comparative Example 8 | (15) | 1 / 59.8 | — | — | 0.001 / 0.012 | 1.95 / 39 | — | 7.1 |
| Comparative Example 9 | (16) | 1 / 79.4 | — | 1.05 / 21 | — | 0.001 / 0.030 | 0.89 | 4.8 |
| Comparative Example 10 | (17) | 1 / 74.7 | — | 0.02 / 0.32 | 1.10 / 24.0 | 0.03 / 0.65 | — | 2.1 |

TABLE 1-1-continued

| | Catalyst | Element Composition* | | | | | D/G ratio | BET specific surface area (m²/g) |
| | | Ti | Fe | C | N | O | | |
|---|---|---|---|---|---|---|---|---|
| Comparative Example 11 | (18) | 1<br>76.2 | —<br>— | 0.52<br>10 | 0.54<br>12.0 | 0.04<br>0.95 | — | 1.4 |
| Comparative Example 12 | (19) | 1<br>67.0 | —<br>— | 0.12<br>2.02 | 0.15<br>2.94 | 1.25<br>28 | 0.89 | 22 |

*An upper column shows a ratio of number of atoms when the number of atoms of titanium is taken as 1. A lower column shows % by mass.

TABLE 2

| | Single cell | Initial voltage (V) | Voltage holding ratio (%) |
|---|---|---|---|
| Example 1 | (1) | 0.501 | 65.3 |
| Example 2 | (2) | 0.536 | 66.3 |
| Example 3 | (3) | 0.527 | 71.6 |
| Example 4 | (4) | 0.502 | 61.7 |
| Example 5 | (5) | 0.600 | 70.7 |
| Example 6 | (6) | 0.580 | 68.4 |
| Example 7 | (7) | 0.659 | 81.0 |
| | (23) | 0.636 | 90.9 |
| Example 8 | (8) | 0.603 | 88.4 |
| Example 9 | (9) | 0.613 | 87.3 |
| Comparative Example 1 | (10) | 0.549 | 56.9 |
| Comparative Example 2 | (11) | 0.445 | 51.3 |
| Comparative Example 3 | (12) | 0.518 | 21.2 |
| Comparative Example 4 | (13) | 0.484 | 53.2 |
| Comparative Example 5 | (14) | 0.418 | 30.4 |
| Comparative Example 6 | (15) | 0.422 | 38.0 |
| Comparative Example 7 | (16) | 0.263 | 0.0 |
| Comparative Example 8 | (17) | 0.087 | 0.0 |
| Comparative Example 9 | (18) | 0.0 | —* |
| Comparative Example 10 | (19) | 0.0 | —* |
| Comparative Example 11 | (20) | 0.0 | —* |
| Comparative Example 12 | (21) | 0.318 | 0.0 |
| Comparative Example 13 | Pt/C | 0.648 | 54.1 |
| Comparative Example 14 | (22) | 0.488 | 76.5 |
| Comparative Example 15 | (24) | 0.0 | —* |
| Comparative Example 16 | (25) | 0.0 | —* |

*A voltage value at 0.3 A/cm² was 0 V for both before and after start-stop test.

REFERENCE SIGNS LIST

1: Reactor (1)
2: Mixed gas (1) of titanium tetrachloride gas and nitrogen gas
3: Mixed gas (4) of methane, ammonia, water and nitrogen
4: Reactant (to be collected)
5: Primary particles of titanium compound
6: Graphite-like carbon
7: Amorphous-like carbon

The invention claimed is:

1. An oxygen reduction catalyst comprising composite particles in which primary particles of a titanium compound are dispersed into a carbon structure, wherein
the composite particles have titanium, carbon, nitrogen and oxygen as constituent elements, and with regard to a ratio of number of atoms of each of the elements when titanium is taken as 1, a ratio of carbon is larger than 2 and 5 or less, a ratio of nitrogen is larger than 0 and 1 or less, and a ratio of oxygen is 1 or more and 3 or less, and
an intensity ratio (D/G ratio) of the composite particles of D band peak intensity to G band peak intensity in a Raman spectrum is in the range of 0.4 to 1.0.

2. The oxygen reduction catalyst according to claim 1, wherein the composite particles further comprise at least one kind of element M2 selected from iron, nickel, chromium, cobalt and manganese, and a ratio of number of atoms of total amount of element M2 to titanium is in the range of 0.3 or less.

3. The oxygen reduction catalyst according to claim 1, wherein the composite particles have a peak, in X-ray diffraction (XRD) measurement using a Cu-Kα line, in each of regions A to D of a 2θ range described below:
A: 26 to 28°;
B: 35 to 37°;
C: 40 to 42°; and
D: 53 to 55°, and
have a peak with the highest intensity of all the peaks that appear in a diffraction pattern in the region A.

4. The oxygen reduction catalyst according to claim 1, wherein a valence of titanium determined from a transmission X-ray absorption fine structure analysis (transmission XAFS) of the composite particles is larger than 3 and less than 4.

5. The oxygen reduction catalyst according to claim 1, further having particles comprising a noble metal or a noble metal alloy supported on the composite particles.

6. The oxygen reduction catalyst according to claim 5, wherein the noble metal includes at least one kind of noble metal selected from platinum, palladium, iridium, rhodium and ruthenium.

7. The oxygen reduction catalyst according to claim 5, wherein the particles comprise the noble metal alloy and the noble metal alloy includes an alloy comprising noble metals, or a noble metal and at least one kind of metal selected from iron, nickel, chromium, cobalt, titanium, copper, vanadium and manganese.

8. An ink for preparing a catalyst layer for a fuel cell, comprising the oxygen reduction catalyst according to claim 1.

9. A catalyst layer for a fuel cell, prepared using the ink for preparing the catalyst layer for the fuel cell according to claim 8.

10. An electrode for a fuel cell, comprising the catalyst layer for the fuel cell according to claim 9.

11. A membrane-electrode assembly, comprising a cathode catalyst layer and an anode catalyst layer, and a polymer electrolyte membrane arranged between both the catalyst layers, wherein the cathode catalyst layer and/or the anode catalyst layer is the catalyst layer for the fuel cell according to claim 9.

12. A fuel cell, comprising the membrane-electrode assembly according to claim 11.

13. A method for producing the oxygen reduction catalyst according to claim 1, comprising:
- Step 1 for mixing a titanium-containing compound (1), a nitrogen-containing organic compound (2) and a solvent to give a catalyst precursor solution;
- Step 2 for removing the solvent from the catalyst precursor solution to give a solid residue;
- Step 3 for heat-treating the solid residue obtained in Step 2 at a temperature of 700° C. to 1,400° C. to give a heat-treated material; and
- Step 4 for applying oxidation treatment of the heat-treated material obtained in Step 3 with an oxidizing agent giving an oxygen atom, wherein at least one of the titanium-containing compound (1) and the nitrogen-containing organic compound (2) has an oxygen atom, and oxidization in Step 4 is adjusted to render a D/G ratio in the range of 0.4 to 1.0.

14. The method for producing the oxygen reduction catalyst according to claim 13, wherein the oxidizing agent giving the oxygen atom is at least one kind selected from water, hydrogen peroxide, perchloric acid and peracetic acid.

15. The method for producing the oxygen reduction catalyst according to claim 13, wherein Step 4 overlaps with Step 3 and is applied after or at the same time as start of Step 3.

16. The method for producing the oxygen reduction catalyst according to claim 15, wherein the oxidizing agent used in a part of Step 4, which overlaps with Step 3, is water.

17. The method for producing the oxygen reduction catalyst according to claim 15, wherein Step 4 is applied even after end of Step 3.

18. The method for producing the oxygen reduction catalyst according to claim 17, wherein the oxidizing agent used in a part of Step 4, which is applied after end of Step 3, is at least one kind selected from hydrogen peroxide, perchloric acid, and peracetic acid.

* * * * *